United States Patent
Yang et al.

(10) Patent No.: US 11,233,655 B2
(45) Date of Patent: Jan. 25, 2022

(54) DATA VERIFICATION METHODS, APPARATUSES, AND DEVICES

(71) Applicant: ALIPAY (HANGZHOU) INFORMATION TECHNOLOGY CO., LTD., Zhejiang (CN)

(72) Inventors: Renhui Yang, Hangzhou (CN); Yuan Chen, Hangzhou (CN); Xinmin Wang, Hangzhou (CN); Wenyu Yang, Hangzhou (CN); Feng Qian, Hangzhou (CN); Qianting Guo, Hangzhou (CN); Shubo Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,579

(22) Filed: Jun. 30, 2021

(65) Prior Publication Data
US 2021/0328806 A1    Oct. 21, 2021

(30) Foreign Application Priority Data
Aug. 31, 2020  (CN) .......................... 202010898940.2

(51) Int. Cl.
*H04L 9/32*    (2006.01)
*H04L 9/08*    (2006.01)

(52) U.S. Cl.
CPC .......... *H04L 9/3242* (2013.01); *H04L 9/0825* (2013.01); *H04L 9/3247* (2013.01); *H04L 2209/38* (2013.01)

(58) Field of Classification Search
CPC ... H04L 9/3242; H04L 9/3247; H04L 9/0825; H04L 2209/38
See application file for complete search history.

(56) References Cited

U.S. PATENT DOCUMENTS 9,697,371 B1 * 7/2017 Willden ............... H04L 63/0428
10,699,269 B1    6/2020 Blankstein et al.
(Continued)

FOREIGN PATENT DOCUMENTS

| CN | 106874087 | 6/2017 |
| CN | 107886329 | 4/2018 |

(Continued)

OTHER PUBLICATIONS

Krawiecka et al, "Safekeeper: Protecting Web Passwords using Trusted Execution Environments", Apr. 23, 2018, p. 1-16.*

(Continued)

*Primary Examiner* — Christopher A Revak
(74) *Attorney, Agent, or Firm* — Fish & Richardson P.C.

(57) ABSTRACT

Examples in this application disclose data verification methods, media, and systems. One example method includes receiving, from a blockchain network by a trusted execution environment (TEE) in a blockchain node, a trigger instruction based on a timed starting logic identifying a starting time to execute a smart contract, where the timed starting logic is comprised in a chain code which comprises information of a blockchain account and is executable by the blockchain node to determine the information of the blockchain account, retrieving first encrypted data from a first institution, decrypting the first encrypted data, receiving a data sharing request comprising a user identity corresponding to user basic data from a second institution, retrieving the user basic data based on the user identity, performing verification processing of the user basic data based on the trigger instruction to obtain a verification result, and sending the verification result to the second institution.

20 Claims, 6 Drawing Sheets

(56) References Cited

U.S. PATENT DOCUMENTS

| | | | |
|---|---|---|---|
| 10,833,846 B1 * | 11/2020 | Zhuo | ............... H04L 9/3239 |
| 10,833,848 B1 * | 11/2020 | Zhuo | ............... H04L 9/3239 |
| 2017/0287068 A1 | 10/2017 | Nugent | |
| 2019/0279206 A1 * | 9/2019 | Song | ............... G06F 16/1834 |
| 2020/0036533 A1 * | 1/2020 | Soundararajan | ...... H04W 12/61 |
| 2020/0106611 A1 * | 4/2020 | Bharatam | ............. H04L 9/0841 |
| 2020/0204557 A1 | 6/2020 | Singh et al. | |

FOREIGN PATENT DOCUMENTS

| | | |
|---|---|---|
| CN | 110264190 | 9/2019 |
| CN | 110704490 | 1/2020 |
| CN | 111147432 | 5/2020 |
| CN | 111316303 | 6/2020 |
| EP | 3477891 | 5/2019 |

OTHER PUBLICATIONS

Sabt et al, "Trusted Execution Environment: What It is, and What It is Not", Aug. 2015, 14th IEEE International Conference on Trust, Security and Privacy in Computing and Communications, p. 1-9.*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Application No. 21181106.2, dated Dec. 3, 2021, 9 pages.

* cited by examiner

DATA VERIFICATION METHODS, APPARATUSES, AND DEVICES

CROSS-REFERENCE TO RELATED APPLICATIONS

This application claims priority to Chinese Patent Application No. 202010898940.2, filed on Aug. 31, 2020, which is hereby incorporated by reference in its entirety.

TECHNICAL FIELD

Embodiments of the present specification relate to the field of blockchain technologies, and in particular, to data verification methods, apparatuses, and devices.

BACKGROUND

A blockchain is a new application mode of computer technologies such as distributed data storage, point-to-point transmission, a consensus mechanism, and an encryption algorithm. A blockchain is a chained data structure obtained by combining data blocks in chronological order, and uses a cryptography method to ensure that a distributed ledger cannot be tampered with or forged. Because a blockchain has features such as de-centralization, non-tampering, and autonomy, the blockchain is attracting more attention and more widely applied.

SUMMARY

According to a first aspect, some embodiments of the present specification provide a data verification method, where the method is applied to a privacy computing unit and includes: receiving a trigger instruction that is sent by a blockchain platform based on timed starting logic defined in a chain code; performing verification processing on user basic data based on the trigger instruction to obtain a verification result, where the user basic data is obtained after first encrypted data sent by a first institution is decrypted, and the user basic data is user basic data obtained based on a user ID included in a data sharing request sent by a second institution; and sending the verification result to the second institution.

According to a second aspect, some embodiments of the present specification provide a method for starting a smart contract, where the method includes: running timed starting logic defined in a chain code; determining, based on the timed starting logic, whether a current moment reaches a timed starting moment, to obtain a first determining result; and if the first determining result is yes, sending an instruction used to start a first smart contract, where the first smart contract is used to perform verification processing on encrypted user basic data, and send a verification result to a specified address.

According to a third aspect, some embodiments of the present specification provide a data verification apparatus, where the apparatus is applied to a privacy computing unit and includes: a trigger instruction receiving module, configured to receive a trigger instruction that is sent by a blockchain platform based on timed starting logic defined in a chain code; a data verification module, configured to perform verification processing on user basic data based on the trigger instruction to obtain a verification result, where the user basic data is obtained after first encrypted data sent by a first institution is decrypted, and the user basic data is user basic data obtained based on a user ID included in a data sharing request sent by a second institution; and a verification result sending module, configured to send the verification result to the second institution.

According to a fourth aspect, some embodiments of the present specification provide an apparatus for starting a smart contract, including: a code running module, configured to run timed starting logic defined in a chain code; a result determining module, configured to determine, based on the timed starting logic, whether a current moment reaches a timed starting moment, to obtain a first determining result; and an instruction sending module, configured to: if the first determining result is yes, send an instruction used to start a first smart contract, where the first smart contract is used to perform verification processing on encrypted user basic data, and send a verification result to a specified address.

According to a fifth aspect, some embodiments of the present specification provide a data verification device, including: at least one processor; and a memory communicatively connected to the at least one processor; where the memory stores instructions that can be executed by the at least one processor, and the instructions are executed by the at least one processor to enable the at least one processor to: receive a trigger instruction that is sent by a blockchain platform based on timed starting logic defined in a chain code; perform verification processing on user basic data based on the trigger instruction to obtain a verification result, where the user basic data is obtained after first encrypted data sent by a first institution is decrypted, and the user basic data is user basic data obtained based on a user ID included in a data sharing request sent by a second institution; and send the verification result to the second institution.

According to a sixth aspect, some embodiments of the present specification provide a device for starting a smart contract, including: at least one processor; and a memory communicatively connected to the at least one processor; where the memory stores instructions that can be executed by the at least one processor, and the instructions are executed by the at least one processor to enable the at least one processor to: run timed starting logic defined in a chain code; determine, based on the timed starting logic, whether a current moment reaches a timed starting moment, to obtain a first determining result; and if the first determining result is yes, send an instruction used to start a first smart contract, where the first smart contract is used to perform verification processing on encrypted user basic data, and send a verification result to a specified address.

Some embodiments of the present specification provide a computer readable medium that stores computer readable instructions, and the computer readable instructions can be executed by a processor to implement a data verification method or a method for starting a smart contract.

Some embodiments of the present specification achieve the following beneficial effects:

By using the solution in the previously-mentioned embodiments, an institution that originally does not have the capability to perform anti-money laundering work can be empowered, so such an institution can have a KYC result of a user who purchases a financial product of the institution, thereby satisfying a specified anti-money laundering audit obligation, and improving an overall KYC verification capability of the industry. In addition, a blockchain node proactively starts a smart contract at a timed moment to complete a timed task, so an initiator of the timed task does not need to submit a blockchain transaction at a timed moment to the blockchain network to invoke the smart contract. On one hand, the blockchain node does not need to receive a blockchain transaction invoking the smart contract, so the blockchain node can reduce operations of processing the blockchain transaction invoking the target smart contract, resource consumption of the blockchain node can be reduced, and efficiency of completing the timed task can be improved. On the other hand, the blockchain network automatically starts the smart contract to complete the timed task, thereby simplifying operations of the initiator of the timed task, and improving user experience.

BRIEF DESCRIPTION OF DRAWINGS

To describe technical solutions in the embodiments of the present specification or in the existing technology more clearly, the following briefly describes the accompanying drawings required for describing the embodiments or the existing technology. Clearly, the accompanying drawings in the following description merely show some embodiments of the present specification, and a person of ordinary skill in the art can still derive other drawings from these accompanying drawings without creative efforts.

DESCRIPTION OF EMBODIMENTS

Figure 1:
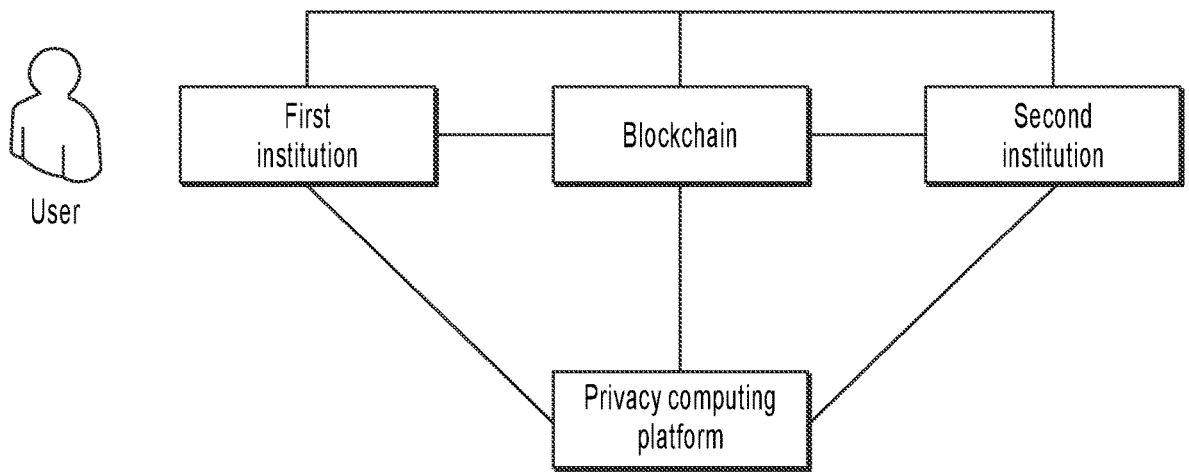
FIG. 1 is a schematic diagram illustrating a system architecture, according to some embodiments of the present specification.

To make the objectives, technical solutions, and advantages of one or more embodiments of the present specification clearer, the following clearly and comprehensively describes the technical solutions of one or more embodiments of the present specification with reference to corresponding accompanying drawings and one or more specific embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of one or more embodiments of the present specification.

Data sharing is often required by institutions to process services. A single institution is often unable to obtain enough information to process a service, and needs to obtain information from other institutions. For example, many countries require financial institutions to provide anti-money laundering audit results in the requirements of Anti-Money Laundering (AML) compliance. At present, many national central banks and large financial institutions have tried to improve efficiency and accuracy by using blockchains in the field of anti-money laundering and to satisfy regulatory requirements. Meanwhile, data (as resources) mobility and accessibility are the foundation of many data applications and industry development. However, privacy protection in data exchange and sharing is a challenge to industry development. The following still uses the previously-mentioned anti-money laundering as an example for description.

Anti-money laundering is a measure to prevent money laundering activities that cover up and conceal sources and nature of earnings from drug crimes, organized crimes of a gangdom, terrorist crimes, smuggling crimes, corruption and bribery crimes, and crimes against financial management order by using various means. Common money laundering paths involve fields such as banking, insurances, securities, and real estate. Most anti-money laundering matters include three core aspects:

1. Customer identification system. During establishment of a service relationship or a transaction with a customer, the subject of the anti-money laundering obligation shall verify and record an identity of the customer based on an actual and valid identity card, and update the customer's identity information in time during the existence of the service relationship.

2. Large Suspicious Transaction Report (STR) system. Illegal capital flows are usually characterized by large amounts and abnormal transactions. Therefore, the STR is stipulated in laws. For the amount of transactions that reached certain standard and abnormal transactions without a legitimate purpose, financial institutions are required to report to the anti-money laundering administrative department in a timely method for the purpose of tracing illegal crimes.

3. Customer identity information and transaction record retention rules. The retention of customer identity information and transaction records means that financial institutions take the necessary measures to save customer identity information and transaction information for a certain period of time based on laws, so as to provide evidence for tracing illegal crimes.

The customer identity identification system, which is commonly referred to as Know Your Customer (KYC), refers to obtaining customer-related identification information, including knowing the identity of the customer when establishing a service relationship with the customer, knowing the purpose of the transaction, knowing the source and whereabouts of the capital, knowing the daily service activities and financial transactions of the customer, etc., which are the bases for anti-money laundering.

In an existing implementation, there is a cooperative relationship between a sales institution and a sales agency of some financial products. A financial institution sells its financial products through a sales agency, for example, a network platform sells financial products of a fund company. In this case, customers who buy financial products are often customers of the sales agency. Based on the regulatory requirements, a KYC verification result for the customer is needed for financial product sales. As mentioned above, customers who purchase financial products are direct customers of a sales agency. The sales agency can directly obtain basic information of users, thus having the KYC capability. Based on requirements of data privacy protection, the sales agency cannot directly transfer KYC basic data and KYC results to the sales institution. The sales institution cannot perform independent KYC without the KYC basic data. Based on the regulatory requirements, the sales institution also needs to have the KYC verification result. In this case, the sales institution cannot perform KYC, and cannot satisfy the regulatory requirements since KYC is not fulfilled properly.

FIG. 1 is a schematic diagram illustrating a system architecture, according to some embodiments of the present specification. As shown in FIG. 1, a first institution can directly receive information of a user, so as to complete certain processing work based on the information of the user, for example, KYC verification mentioned in the KYC scenario. In addition, the first institution can provide a KYC verification result externally, or can provide basic data required for KYC verification externally. A second institution can be directly connected to the first institution. In addition, both the first institution and the second institution can be connected to a blockchain system, and can be connected to a privacy computing platform. By using the privacy computing platform, a predetermined rule can be executed in a trusted security computing environment, thereby completing a task such as KYC verification.

A blockchain network is generally classified into three types: a public blockchain, a private blockchain, and a consortium blockchain. In addition, there are several types of combinations, such as private blockchain+consortium blockchain, and consortium blockchain+public blockchain. The public blockchain has the highest degree of de-centralization. The public blockchain is represented by Bitcoin and Ethereum. Participants who join the public blockchain can read on-chain data records, participate in transactions, and compete for bookkeeping rights of new blocks. Furthermore, each participant (i.e., blockchain node) can freely join and exit the network and perform related operations. On the contrary, a write access permission of the private blockchain network is controlled by a certain organization or institution, and a data reading right is specified by the organization. In short, the private blockchain can be a weak centralization system, and participating nodes are strictly limited and rare. This type of blockchain is more suitable for internal use within a specific organization. The consortium blockchain is a blockchain balanced between the public blockchain and the private blockchain, and can be "partially decentralized". Each node in the consortium blockchain usually has a corresponding entity institution or organization. Participants join the network through authorization and form interest-related consortiums to jointly maintain blockchain operation.

In the related technologies, all of the public blockchain, the private blockchain, and the consortium blockchain may provide functions of a smart contract. The smart contract on the blockchain is a contract that can be triggered by a transaction on the blockchain system. The smart contract can be defined in the form of codes.

Taking an account model (for example, Ethereum) as an example, a blockchain account can include an external account, a contract account, etc. The external account is usually owned by a user (an individual or an institution), while the contract account corresponds to the smart contract deployed in the blockchain. The structures of various accounts are similar, and can include fields such as Balance, Nonce, Code, and Storage, where: the Balance field is used to maintain the current account balance;

the Nonce field is used to maintain the number of transactions of the account, and is a counter used to ensure that each transaction can be processed only once, effectively avoiding replay attacks;

the Code field is used to maintain the contract code of the account (therefore, the Code field of the external account is usually null); in practice, the Code field usually maintains only the hash value of the contract code; therefore, the Code field is also commonly referred to as a Codehash field; and the Storage field is used to maintain the storage content of the account (the default field value is null). For the contract account, an independent storage space is usually allocated to store the content of the contract account. The independent storage space is commonly referred to as the account storage of the contract account. The storage content of the contract account usually constructs a data structure of a Merkle Patricia Trie (MPT) tree and stored in the previously-mentioned independent storage space. An MPT tree constructed based on the storage content of the contract account is usually referred to as a Storage tree. The Storage field usually maintains only the root node of the Storage tree. Therefore, the Storage field is also commonly referred to as a StorageRoot field.

An Ethereum virtual machine (EVM) is the core of Ethereum, which is a programmable blockchain, and each Ethereum node can run the EVM. The EVM is a Turing-complete virtual machine, through which various complex logics can be implemented. The user actually broadcasts and invokes the smart contract on the EVM in Ethereum. In fact, the virtual machine directly runs a virtual machine code (virtual machine bytecode, "bytecode" for short). The smart contract has a deployment phase and an invoking phase.

In the deployment phase, the user sends a transaction that includes information about creating a smart contract to an Ethereum network. The data field of the transaction includes a code (such as a bytecode) of the smart contract. The to field of the transaction is null. Each node in the Ethereum network performs this transaction by using the EVM, and generates a corresponding contract instance. After consensus is reached between nodes by using a consensus mechanism, the smart contract corresponding to the previously-mentioned transaction is successfully created, and a contract account corresponding to the smart contract appears on the blockchain. The contract account has a specific contract address, a contract code (that is, a code of the smart contract), or a hash value of the contract code is stored in the contract account, and the contract code is used to control behavior of the corresponding smart contract.

In the invoking phase, a user (which can be the same or different from the user deploying the smart contract) sends a transaction used to invoke a smart contract to the Ethereum network, where the from field of the transaction is an address of an external account corresponding to the user, the to field is a contract address of the smart contract that needs to be invoked, and the data field includes a method and input parameter data for invoking the smart contract. After consensus is reached between the nodes by using the consensus mechanism, the smart contract invoked as declared by the above transaction is independently executed on each node of the Ethereum network in a specified method, and all execution records and data are stored in the blockchain. Therefore, after the transaction is completed, transaction records that cannot be tampered with and will not be lost are stored in the blockchain.

If the privacy computing platform completes KYC verification by running a smart control, because a smart contract on a blockchain network in the related technology is executed only when a contract invoker invokes the smart contract, that is, in the related technology, a blockchain node is triggered, by using a transaction, to execute the smart contract, the blockchain node cannot proactively start execution of the smart contract. However, in practice, there are various KYC verifications, and it is not possible to verify each user by using a transaction to trigger a smart contract. In addition, resources would be wasted. A better solution is to periodically verify user information of a plurality of users, for example, 10 o'clock in the morning or 10 o'clock in the evening. Therefore, a timed starting for a smart contract is needed. For example, a blockchain node in a blockchain network can proactively start a smart contract at a timed moment, so as to complete a timed task by proactively executing the smart contract at a timed moment. To this end, the purpose of the present specification is to provide a method for starting a smart contract at a timed moment through a blockchain platform to perform KYC verification to satisfy active start needs of a smart contract.

Figure 2:
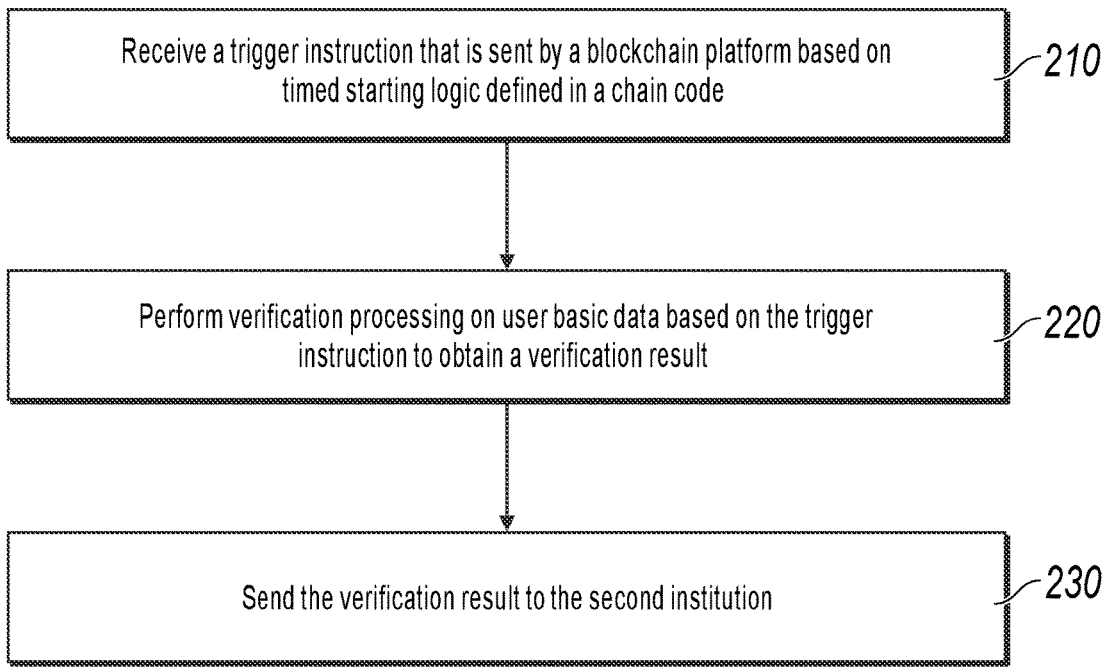
FIG. 2 is a schematic flowchart illustrating a data verification method, according to some embodiments of the present specification.

FIG. 2 is a schematic flowchart illustrating a data verification method, according to some embodiments of the present specification. The method is applied to a privacy computing unit, where the privacy computing unit can be a node deployed on a blockchain platform, or can be a node deployed off a blockchain platform. Regardless of whether the privacy computing unit is deployed on a blockchain or off a blockchain, a smart contract in the privacy computing unit can be started by using on-chain timed starting logic.

As shown in FIG. 2, the process can include the following steps:

Step 210: Receive a trigger instruction that is sent by a blockchain platform based on timed starting logic defined in a chain code.

The timed starting logic is used to determine a starting moment of a target smart contract, and start the target smart contract when a current moment reaches the starting moment.

In some embodiments, when a blockchain network is built, a chain code of the blockchain network can be configured in a node device, so the node device runs the chain code as a blockchain node in the blockchain network. A timed starting logic can be defined in the chain code of the blockchain network in advance, so that the blockchain node can proactively start a smart contract deployed on the blockchain network, and does not need to execute the smart contract by responding to a received blockchain transaction used to invoke the smart contract. In this case, the blockchain node can complete the above previously-mentioned operation of proactively starting the smart contract at a timed moment by using the timed starting logic when executing the chain code.

Specifically, the timed starting logic can be used to: determine a starting moment of the target smart contract, and start the target smart contract when the current moment reaches the starting moment. The target smart contract can be understood as a smart contract that the blockchain node can proactively start at a timed moment, and a contract code used to complete a timed task is defined in the smart contract. For example, the timed task can be an operation such as timed remittance, timed distribution of virtual rights and interests to a specified user, or a timed reminder. Taking timed transfer as an example, an account address of a blockchain account of a remitter, an account address of a blockchain account of a remittee, and a remittance amount per time can be defined in a contract code of the target smart contract. It is worthwhile to note that the target smart contract can still be deployed to the blockchain network in the previously-mentioned related technology.

It can be understood that the blockchain node proactively starts the smart contract at a timed moment to complete the timed task, so an initiator of the timed task does not need to submit a blockchain transaction at a timed moment to the blockchain network to invoke the smart contract. On one hand, the blockchain node does not need to receive a blockchain transaction invoking the smart contract, so the blockchain node can reduce operations (for example, consensus, anti-replay check, and anti-double-spending check, and the like) of processing the blockchain transaction invoking the target smart contract, resource consumption of the blockchain node can be reduced, and efficiency of completing the timed task can be improved. On the other hand, the blockchain network automatically starts the smart contract to complete the timed task, thereby simplifying operations of the initiator of the timed task and improving user experience.

In some embodiments, the blockchain node runs the chain code to determine a smart contract that needs to be proactively started at a timed moment, that is, the target smart contract.

In one case, information about the target smart contract can be recorded in the chain code, that is, the information about the target smart contract is written into the chain code when the chain code is developed. For example, a contract address of the target smart contract can be written into the chain code. Based on the information about the target smart contract recorded in the chain code, the blockchain node can determine the target smart contract by running the chain code. By recording the information about the target smart contract in the chain code, the information about the target smart contract can be effectively prevented from being maliciously tampered with.

In another case, the information about the target smart contract (there can be a plurality of target smart contracts) can be recorded in a specific predetermined blockchain account, and information about the predetermined blockchain account is recorded in the chain code, that is, the information about the predetermined blockchain account is written into the chain code when the chain code is developed. For example, the contract address of the target smart contract can be recorded in the predetermined blockchain account, and an account address of the predetermined blockchain account is written into the chain code. Based on the information about the predetermined blockchain account recorded in the chain code, the blockchain node can determine the blockchain account by running the chain code, so as to read the contract address of the target smart contract from the blockchain account. By using the previously-mentioned method of recording the target smart contract by using the blockchain account, it is convenient to update a list of smart contracts that need to be proactively started at a timed moment, so the blockchain network is controlled to complete the timed task more flexibly.

Specifically, an information update transaction that is used to update the information about the target smart contract recorded in the previously-mentioned predetermined blockchain account can be submitted to the blockchain network, where the information update transaction includes contract update information (for example, a contract address of a smart contract that needs to be proactively started a timed moment). Therefore, after receiving the information update transaction, the blockchain node in the blockchain network can update, in response to the information update transaction, the information about the target smart contract recorded in the predetermined blockchain account according to the contract update information included in the information update transaction.

In some embodiments, for a method of recording the starting moment of the target smart contract, references can also be made to the previously-mentioned method of recording the information about the target smart contract. That is, the blockchain node runs the chain code to determine the starting moment of the target smart contract. The following provides the details.

In one case, the starting moment of the target smart contract can be recorded in the chain code, that is, the starting moment of the target smart contract is written into the chain code when the chain code is developed. Based on the starting moment of the target smart contract recorded in the chain code, the blockchain node can determine the starting moment of the target smart contract by running the chain code, and then start the target smart contract when the current moment reaches the starting moment. By recording the starting moment of the target smart contract in the chain code, the starting moment of the target smart contract can be effectively prevented from being maliciously tampered with.

In another case, the starting moment can be recorded by using a specific predetermined blockchain account, and information about the predetermined blockchain account is recorded in the chain code, that is, the information about the predetermined blockchain account is written into the chain code when the chain code is developed. Based on the information about the predetermined blockchain account recorded in the chain code, the blockchain node can determine the blockchain account by running the chain code, so as to read the starting moment of the target smart contract from the blockchain account. By using the previously-mentioned method of recording the starting moment of the target smart contract by using the blockchain account, it is convenient to update the starting moment of the smart contract that needs to be proactively started at a timed moment, so the blockchain network is controlled to complete the timed task more flexibly.

Specifically, a moment update transaction used to update the starting moment recorded in the previously-mentioned predetermined blockchain account can be submitted to the blockchain network, where the moment update transaction includes moment update information (for example, content used to indicate how to update the starting moment). Therefore, after receiving the moment update transaction, the blockchain node in the blockchain network can update, in response to the moment update transaction, the starting moment of the target smart contract recorded in the predetermined blockchain account according to the contract update information included in the moment update transaction.

Further, to prevent the starting moment of the target smart contract in the blockchain account from being maliciously tampered with, permission management can be performed on an operation of the previously-mentioned updated starting moment. For example, a proof for implementing permission management can be stored in the predetermined blockchain account. For example, the proof can be stored in the predetermined blockchain account in a form of a whitelist, a blacklist, etc. For example, an account address of an administrator of the blockchain network can be recorded in a whitelist. Then, after receiving the moment update transaction, the blockchain node can first read the account address recorded in the to field of the moment update transaction (that is, an account address of a user who submits the moment update transaction), and then determine whether the whitelist in the predetermined blockchain account records the account address; and if the whitelist in the predetermined blockchain account records the account address, the previously-mentioned update operation is further performed; otherwise, the previously-mentioned update operation is prohibited.

It is worthwhile to note that in the blockchain network, the blockchain account can include an external account, a contract account, etc. The external account is usually owned by a user (an individual or an institution), while the contract account corresponds to the smart contract deployed in the blockchain. Structures of various accounts are similar, for example, can include the Nonce field, the Balance field, the Code field, and the Storage field. The value of the Nonce field of each account starts from 0, and the value of the Nonce field increases continuously with transactions initiated by the corresponding account, so the Nonce value of each transaction initiated by the account is different, thereby avoiding replay attacks. The Balance field is used to store the balance. The Code field is used to store the code of the smart contract, so the Code field of the external account is usually null. The Storage field is used to store the content of the account. Therefore, data such as the information about the previously-mentioned target smart contract, the proof for permission management, and the starting moment can be recorded and maintained by using the external account or the contract account.

In one case, a smart contract can be pre-deployed in the blockchain network, and a contract account corresponding to the smart contract is used to record and maintain the information about the target smart contract. For example, the information about the target smart contract can be stored in the Storage field of the contract account. In another case, an external account can be created in the blockchain network to record and maintain the information about the target smart contract. For example, the information about the target smart contract can be stored in the Storage field of the external account. Certainly, the present specification does not limit the contract account and the field of the contract account to store the information about the target smart contract. For example, the information about the target smart contract can also be stored in any other field, an added field, or an improved field. This is not limited in the present specification.

It is worthwhile to note that the previously-mentioned predetermined blockchain account that records the information about the target smart contract and the predetermined blockchain account that records the starting moment can be a same blockchain account, or can be different blockchain accounts. This is not limited in the present specification.

In some embodiments, the blockchain node completes the process of proactively starting the target smart contract at a timed moment by running the timed starting logic defined in the chain code.

If the privacy computing unit is deployed on a blockchain, that is, the smart contract is deployed on a blockchain, information about the target smart contract can be directly indicated on the chain code. Therefore, when the timed starting logic defined in the chain code is run, a contract code of the target smart contract can be searched for based on the recorded information about the target smart contract, so as to execute the contract code, that is, trigger the target smart contract. If the privacy computing unit is deployed off a blockchain, the trigger instruction for running the target smart contract can be forwarded to the privacy computing unit by using the oracle mechanism.

Step 220: Perform verification processing on user basic data based on the trigger instruction to obtain a verification result, where the user basic data is obtained after first encrypted data sent by a first institution is decrypted, and the user basic data is user basic data obtained based on a user ID included in a data sharing request sent by a second institution.

It is worthwhile to note that the first institution can refer to a sales agency, and the second institution can refer to a financial institution.

The privacy computing unit can perform KYC verification on the user basic data by using a smart contract, where the user basic data can be pre-stored encrypted user basic data, that is, the first encrypted data, which is sent by the first institution to the privacy computing unit. The data sharing request sent by the second institution can trigger the first institution to send the first encrypted data, where the data sharing request includes a user ID whose KYC verification institution needs to be obtained, and the data sharing request can be directly sent to the first institution, or can be transmitted by using the privacy computing unit. In both cases, the user ID of the data sharing request can be encrypted in a transmission process.

The user ID can be sent to the financial institution by the sales agency. Specifically, the sales agency receives the user basic data, and sends the user ID to the financial institution.

The user purchases financial products of the financial institution through the sales agency. The sales agency can request the user to provide basic data for KYC verification. Such a user can be an individual user, an enterprise user, etc. For an individual user, the basic data can include a part or all of information such as name, gender, nationality, certificate type, certificate number, age, occupation, mobile phone number, contact address, etc. of the individual. For an enterprise user, the basic data can include a part or all of information such as name, business license number, business place address, name of legal representative, certificate type, certificate number, validity period, etc. of the enterprise. Most of the information is sensitive and is not expected to be output outside the sales agency.

The user ID can be an account registered by the user at the sales agency, or an account allocated to the user by a system of the sales agency when the user initiates a purchase operation at the sales agency. Such an account can be, for example, a character string. The user ID should specifically identify a user. The corresponding field is information of the individual user or the enterprise user as described above.

For an individual user, if an identity card is uniformly used as the certificate type, the user ID can also be an identity card number. However, the identity card number is actually also personal privacy data. Therefore, considering that personal privacy data should not be disclosed, hash processing can be performed on the identity card number. Because hash calculation has a unidirectional feature and a feature of hiding original information, and a good hash function has an anti-collision capability, that is, there is a very high probability that hash values obtained by different inputs are also different, a hash calculation result (or referred to as a digest value) can be used as a user ID. This is also the case for the mobile phone number.

Similarly, hash calculation can be performed after a group of data of a user is concatenated in order, and a digest value obtained is used as a user ID, for example, a digest value obtained by hash(name+certificate type+certificate number) is used as a user ID, where "+" can represent sequential concatenation of characters beforehand and afterward. KYC in anti-money laundering generally has a relatively high requirement for data security. To further strengthen data security protection, a salting operation can also be performed in hash calculation, for example, hash(name+certificate type+certificate number+salt), where salt is a value generated based on a predetermined rule.

The sales agency can prompt the user to provide the basic data when the user registers, or can request the user to provide the basic data when the user initiates purchasing of a financial product on the sales agency platform.

The sales agency can send the user ID to the financial institution, for example, can send the user ID to the financial institution in a process of transmitting order information of the financial product to the financial institution. Specifically, the sales agency can directly send the user ID to the financial institution, for example, send the digest value obtained through hash processing to the financial institution, or can encrypt and send the user ID to the financial institution to improve security of data transmission, for example, encrypt and send the identity card number/the mobile phone number used as the user ID to the financial institution, and send the previously-mentioned digest value obtained through hash processing to the financial institution. For the encrypted sending to the financial institution, the user ID can be encrypted and sent to the financial institution by the sales agency in a symmetric or asymmetric encryption method. If symmetric encryption is used, that is, a case that an encryption key and a decryption key are the same key, the key can be obtained through a key negotiation process between the sales agency and the financial institution. If asymmetric encryption is used, that is, an encryption key and a decryption key are two different but corresponding keys, one is a public key for encryption, and the another is a private key for decryption, generally, the sales agency can encrypt the user ID in the verification result by using a public key of the financial institution, and then send the user ID to the financial institution, so the financial institution decrypts the user ID by using a corresponding private key.

To further improve security of data transmission, that is, although encrypted data is transmitted, an incorrect recipient is not expected to receive the data. Therefore, before sending the user ID to the financial institution, the sales agency can first acknowledge an identity of the counterpart, which is the financial institution. There are several methods for determining the identity of the counterpart. An implementation of using a distributed digital identity technology combined with a blockchain is listed here. A blockchain can provide a decentralized (or weakly centralized), non-tampering (or difficult to tamper with), trusted distributed ledger, and can provide a secure, stable, transparent, auditable, and efficient method of recording transactions and data information interaction. A blockchain network can include a plurality of nodes. Generally, one or more nodes of the blockchain belong to one participant. Here, a blockchain network formed by a plurality of participants is referred to as a blockchain platform. The blockchain platform can help verify the identity of the financial institution.

Figure 3:
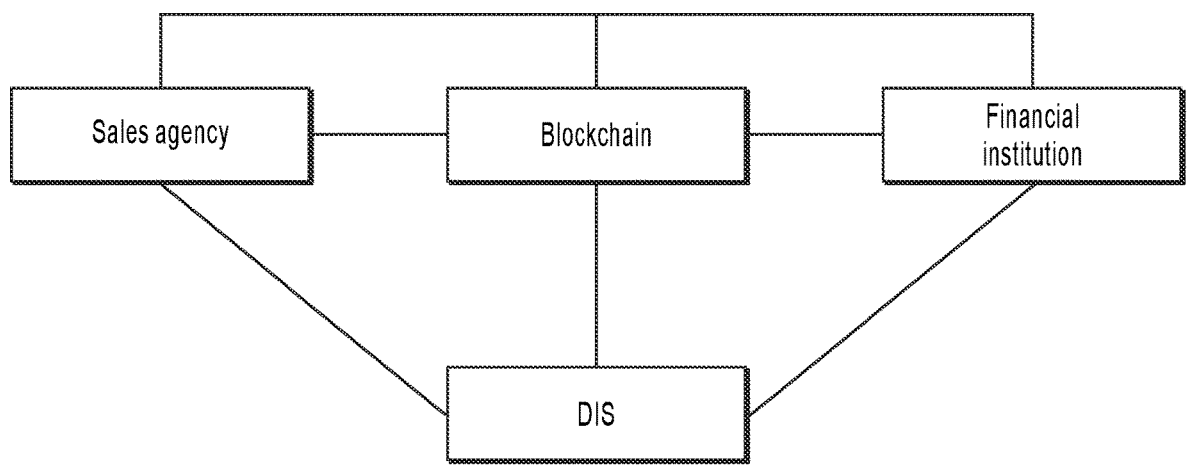
FIG. 3 is an architectural diagram of providing a verification function by a financial institution by using a Decentralized Identity Service (DIS), according to some embodiments of the present specification.
Figure 4:
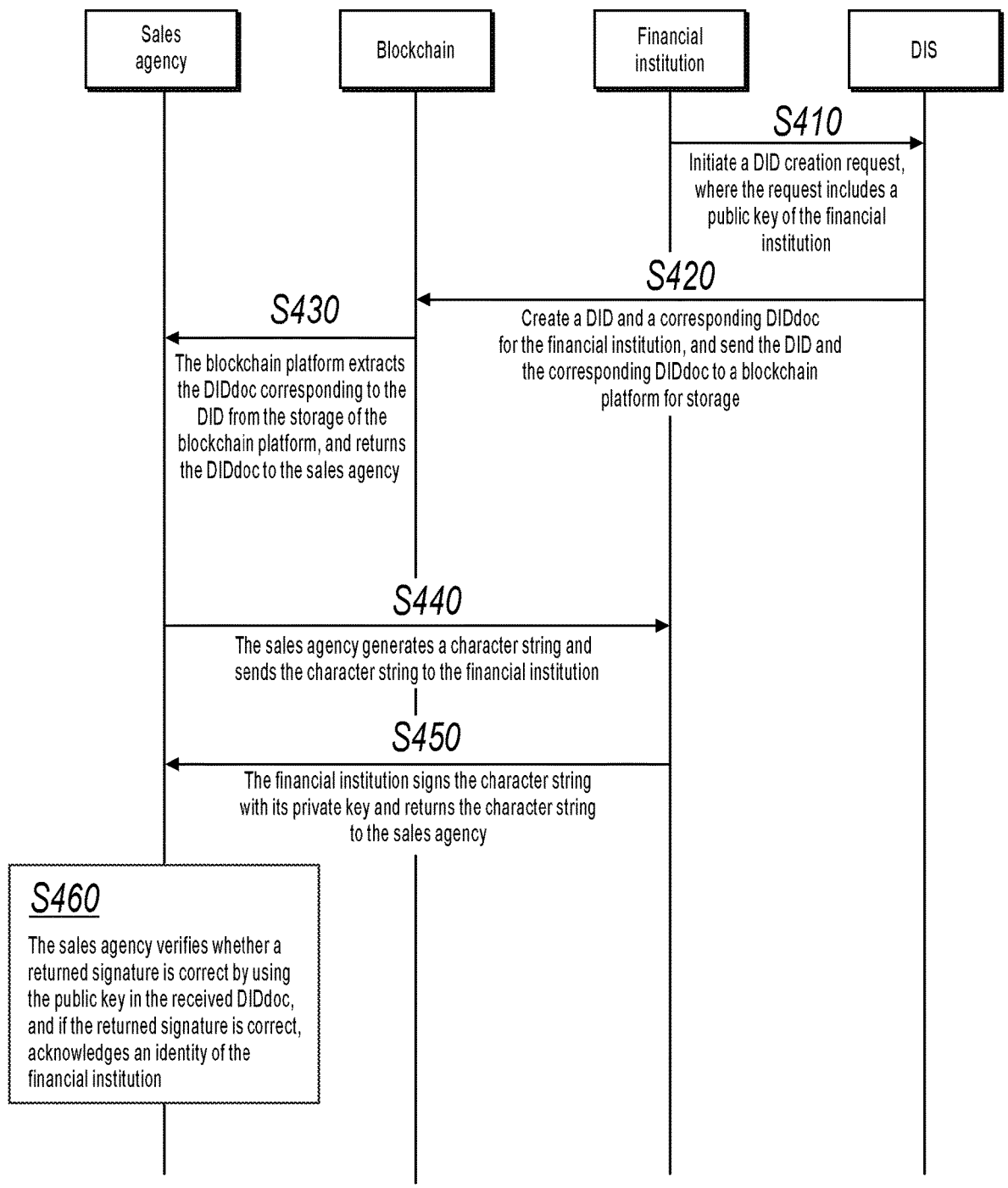
FIG. 4 is a flowchart of providing a verification function by a financial institution, according to some embodiments of the present specification.

In order to use the distributed digital identity service provided by the blockchain platform, the financial institution can register its identity in the blockchain platform. For example, the financial institution can create a pair of public and private keys, secretly store the private key, and can create a distributed digital identity (also referred to as a decentralized identifier, DID). The financial institution can create the DID by itself, or can request a decentralized identity service (DIS) system to create the DID. The DIS is a blockchain-based identity management solution that provides functions such as creating, verifying, and managing digital identities, so as to manage and protect entity data under regulation, ensure authenticity and efficiency of information flow, and solve problems such as cross-institution identity authentication and data cooperation. The DIS system can be connected to the blockchain platform. A DID can be created for the financial institution by using the DIS system, the DID and the public key are sent to the blockchain platform for storage, and the created DID is further returned to the financial institution. The public key can be included in DIDdoc, which can be stored in the blockchain platform. The DIS can create the DID for the financial institution based on the public key sent by the financial institution. For example, the DID is created after the public key of the financial institution is calculated by using the hash function, or can be created based on other information of the financial institution (which can include the public key or not include the public key). The latter case may need the financial institution to provide information other than the public key. Afterward, the financial institution can provide a verification function to prove to other parties that it is the financial institution. For a specific example, references can be made to FIG. 3, and as shown in FIG. 4, the method includes the following steps:

S410: The financial institution initiates a DID creation request to a DIS, where the request includes a public key of the financial institution.

S420: In response to the creation request, the DIS creates a DID and a corresponding DIDdoc for the financial institution, and sends the DID and the corresponding DIDdoc to a blockchain platform for storage, where the DIDdoc includes the public key of the financial institution.

S430: The blockchain platform receives a verification request sent by a sales agency, where the verification request includes the DID of the financial institution; and the blockchain platform extracts the DIDdoc corresponding to the DID from the storage of the blockchain platform, and returns the DIDdoc to the sales agency.

S440: The sales agency generates a character string and sends the character string to the financial institution.

S450: The financial institution signs the character string with its private key and returns the character string to the sales agency.

S460: The sales agency verifies whether a returned signature is correct by using the public key in the previously received DIDdoc, and if the returned signature is correct, acknowledges the identity of the financial institution.

After the sales agency acknowledges the identity of the financial institution in the previously-mentioned method, as described above, the sales agency can send the user ID to the financial institution.

In addition, after obtaining the basic data of the user, the sales agency can further perform KYC verification based on the basic data to obtain a verification result, where the verification result can include, for example, the user ID and the corresponding basic data. For example, for an individual user, verification specifically includes:

whether the name format is correct, for example, whether the name is composed of 2-5 Chinese characters;

whether the gender format is correct, such as male or female;

whether the mobile phone number is correct, such as 11 digits, and begins with fields such as 13, 15, 17, 18, and 19;

whether the contact address is correct, for example, whether the contact address is a string of words containing the province/autonomous region/municipality to the street doorplate number; etc.

As such, a KYC verification result can be obtained.

The financial institution sends a data sharing request to the sales agency, where the data sharing request includes the user ID corresponding to user basic data that is expected to be shared.

The financial institution can send the data sharing request to the sales agency by using a privacy computing unit. Such a data sharing request can be encrypted, thereby ensuring security in a data transmission process. In addition, the financial institution alternatively does not use the privacy computing unit to send the data sharing request to the sales agency, for example, the financial institution directly sends the data sharing request to the sales agency. Specifically, for example, the financial institution can encrypt the user ID in the data sharing request to be transmitted by using a public key of the sales agency. As such, only the sales agency can decrypt the user ID in the data sharing request, because only the sales agency has a private key corresponding to the public key. The financial institution can also sign the sent data sharing request by using the private key of the financial institution. Correspondingly, the recipient (for example, the sales agency here) can verify the signature by using the public key of the financial institution, so the recipient can acknowledge that the received data sharing request is sent by the financial institution, and the received content is complete and not tampered with. Similarly, before sending the data sharing request to the sales agency, the financial institution can further acknowledge an identity of the sales agency. For example, the identity is verified by using a process similar to the previously-mentioned steps S410 to S460, and details are not described again.

In a case that the financial institution sends the data sharing request to the sales agency by using the privacy computing unit, the financial institution can send the data sharing request to the sales agency in a method of initiating a transaction of invoking a contract, and then the privacy computing unit sends the data sharing request to the sales agency.

The blockchain technology supports the user to create and invoke some complex logic in the blockchain network since Ethereum, which is one of the biggest advances of Ethereum compared with the bitcoin technology. An Ethereum Virtual Machine (EVM) is the core of Ethereum, which is a programmable blockchain, and each Ethereum node can run the EVM. The EVM is a Turing-complete virtual machine, through which various complex logics can be implemented. A user can deploy and invoke a smart contract by using the EVM in Ethereum. In the deployment phase, the user can send a transaction for creating a smart contract to Ethereum. The data field of the transaction can include a code (such as a bytecode) of the smart contract. The to field of the transaction is null. After diffusion and consensus of the transaction, each node in the Ethereum network can execute the transaction by using the EVM, and generate a corresponding contract instance, so as to complete deployment of the smart contract. In this case, the blockchain can have a contract account corresponding to the smart contract, and the contract account has a specific contract address. In the invoking phase, a user (which can be the same or different from the user deploying the smart contract) sends a transaction used to invoke a smart contract to the Ethereum network, where the from field of the transaction is an address of an external account corresponding to the user, the to field is a contract address of the smart contract that needs to be invoked, and the data field includes a method and a parameter for invoking the smart contract. After consensus is reached between the nodes by using the consensus mechanism, the smart contract invoked as declared by the above transaction is independently executed on each node of the Ethereum network in a specified method, and all execution records and data are stored in the blockchain. Therefore, after the transaction is completed, transaction records that cannot be tampered with and will not be lost are stored in the blockchain. With development of blockchain technologies, in addition to the EVM, many other types of virtual machines, such as WebAssembly (WASM) virtual machines, are generated.

Each blockchain node can create and invoke a smart contract by using a virtual machine. It is a challenge for privacy protection to store transactions that include smart contracts and execution results of transactions in a blockchain ledger, or to store all ledgers on each full node in the blockchain. Privacy protection can be implemented by using a plurality of technologies, such as cryptography technologies (such as homomorphic encryption or zero-knowledge proof), hardware privacy technologies, and network isolation technologies. The hardware privacy protection technologies typically includes a trusted execution environment (TEE).

For example, the blockchain nodes can implement a secure execution environment for blockchain transactions by using the TEE. The TEE is a trusted execution environment that is based on a secure extension of CPU hardware and fully isolated from the outside. Currently, the industry attaches great importance to the TEE solution. Almost all mainstream chips and software alliances have their own TEE solutions, such as a trusted platform module (TPM) in a software aspect and Intel Software Guard Extensions (SGX), ARM Trustzone, and AMD Platform Security Processor (PSP) in a hardware aspect. The TEE can function as a hardware black box. Codes and data executed in the TEE cannot be peeped even at an operating system level, and can be operated only by using an interface predefined in the codes. In terms of efficiency, because of the black box nature of the TEE, an operation in the TEE is performed on plaintext data instead of a complex cryptographic operation in homomorphic encryption, and efficiency of a calculation process is hardly lost. Therefore, by deploying the TEE environment on the blockchain node, privacy needs in the blockchain scenario can be met to a great extent while a performance loss is relatively small.

Intel SGX (SGX for short) technology is used as an example. The blockchain node can create an enclave based on the SGX technology as a TEE for executing a blockchain transaction. The blockchain node can allocate a part of enclave page cache in a memory by using a processor instruction newly added to a CPU, so as to retain the previously-mentioned enclave. A memory area corresponding to the previously-mentioned EPC is encrypted by a memory encryption engine (MEE) in the CPU, content (codes and data in the enclave) in the memory area can be decrypted only in the CPU core, and keys used for encryption and decryption are generated and stored in the CPU only when the EPC starts. It can be understood that a security boundary of the enclave includes only itself and the CPU, neither privileged nor unprivileged software can access the enclave, and even an operating system administrator and a virtual machine monitor (VMM, or referred to as a hypervisor) can affect the codes and data in the enclave. Therefore, the enclave has very high security. In addition, with the previously-mentioned security guarantee, the CPU can process a blockchain transaction in a plaintext form in the enclave, and has very high operation efficiency, so both data security and calculation efficiency are ensured. Data that enters or exits the TEE can be encrypted, so as to ensure data privacy.

In some embodiments of the present specification, the blockchain node can receive a data sharing request. Specifically, the data sharing request can be received by a privacy computing unit in the blockchain node, and the data sharing request can include a user ID corresponding to the encrypted user basic data that is expected to be shared. As described above, the privacy computing unit in the blockchain node can be, for example, a TEE created by the blockchain node based on the SGX technology, so as to be used for executing the blockchain transaction in a trusted and secret way. A virtual machine can be run in the TEE, so a contract is executed by using the virtual machine. As such, for an encrypted transaction for invoking a contract that is sent to the privacy computing unit of the blockchain node, the privacy computing unit can decrypt and execute the encrypted transaction in the virtual machine loaded in the privacy computing unit, and can encrypt and output an execution result. The technology for remote attestation in SGX can prove that it is legitimate SGX, and programs executed therein (e.g., virtual machine codes) are consistent with expectations. The invoked contract, as described above, can be deployed on the blockchain in advance. The deployed contract, through codes therein, can initiate an access request to data outside the blockchain during execution. Specifically, the data sharing request can be transmitted by the TEE in the blockchain node to the off-chain sales agency by using an oracle mechanism. As such, the financial institution can send the data sharing request to the privacy computing unit by initiating a transaction for invoking a contract, and then the privacy computing unit sends the data sharing request to the sales agency.

When each blockchain node creates and invokes a smart contract by using a virtual machine, relatively more resources are consumed. Comparing to using the TEE technology to protect privacy on each node in the blockchain network, a privacy computing node (that is, an off-chain privacy computing node, also referred to as a "privacy computing unit" in some embodiments of the present disclosure) can be deployed outside the blockchain network (or referred to as "off-chain"), so computing operations that originally need to be performed on all the blockchain nodes are transferred to the off-chain privacy computing node for execution. Based on a verifiable computation technology, it can be proven that the previously-mentioned computing results are actually performed as expected in the TEE, thereby ensuring reliability while reducing on-chain resource consumption.

An off-chain TEE created on the off-chain privacy computing node is similar to the on-chain TEE created on the blockchain node, and can be a TEE implemented based on CPU hardware and fully isolated from the outside. After creating the off-chain TEE, the off-chain privacy computing node can implement a deployment operation on an off-chain contract and an operation of invoking the contract after the deployment by using the off-chain TEE, and ensure data security in the operation process.

Before being used, the privacy computing node can prove to a user that the privacy computing node is trustworthy. The process of proving itself trustworthy may involve a remote attestation report. The processes that the on-chain and off-chain privacy computing nodes prove themselves trustworthy are similar. Using the off-chain privacy computing node as an example, a remote attestation report is generated in a remote attestation process for the off-chain TEE on the off-chain privacy computing node. The remote attestation report can be generated after an authoritative authentication server verifies self-recommendation information generated by the off-chain privacy computing node. The self-recommendation information is related to the off-chain TEE created on the off-chain privacy computing node. The off-chain privacy computing node generates the self-recommendation information related to the off-chain TEE, and after the authoritative authentication server verifies the self-recommendation information, the remote attestation report is generated, so the remote attestation report can be used to indicate that the off-chain TEE on the off-chain privacy computing node is trustworthy.

For example, when sending the data sharing request to the sales agency by using the privacy computing unit off the blockchain, the financial institution can first verify whether the privacy computing unit is trustworthy. Specifically, the sales agency and the financial institution can challenge the off-chain privacy computing node, and receive the remote attestation report returned by the off-chain privacy computing node. For example, the financial institution can initiate an off-chain challenge to the off-chain privacy computing node, that is, the process of initiating the challenge can be independent of the blockchain network, so a consensus process between the blockchain nodes can be skipped and on-chain and off-chain interoperability can be reduced. Therefore, the challenge of the financial institution to the off-chain privacy computing node has higher operational efficiency. For another example, the financial institution can use an on-chain challenge, for example, the financial institution can submit a challenge transaction to the blockchain node. Challenge information contained in the challenge transaction can be transmitted by the blockchain node to the off-chain privacy computing node by using the oracle mechanism, and the challenge information is used to challenge the off-chain privacy computing node. Regardless of the previously-mentioned on-chain challenge or the off-chain challenge, after obtaining the remote attestation report, a challenger (such as the financial institution) can verify a signature of the remote attestation report based on a public key of the authoritative authentication server, and if the verification succeeds, can acknowledge that the off-chain privacy computing node is trustworthy.

The off-chain privacy computing platform can store a pair of public and private keys in the TEE. The public key can be sent to the counterpart in a process such as a remote attestation process, and the private key is properly stored in the TEE. When it is determined, based on the remote attestation report, that the off-chain privacy computing node is trustworthy, the financial institution can encrypt and transmit a bytecode of the off-chain contract to the off-chain privacy computing node, and the off-chain privacy computing node obtains the bytecode through decryption in the off-chain trusted execution environment and deploys the bytecode. The previously-mentioned encryption can use the public key. In the previously-mentioned process, after a contract is deployed on the off-chain privacy computing node, the contract can be stored, and a hash value of the contract is calculated. The hash value of the contract can be fed back to the deployer of the contract. The deployer can locally generate a hash value for the deployed contract. Therefore, the deployer can compare whether a hash value of the deployed contract is the same as the local contract hash value. If they are the same, it indicates that the contract deployed on the off-chain privacy computing node is a contract deployed by the deployer. Content sent from the off-chain privacy computing node can be signed by using a private key stored in the TEE, so as to prove that the content is a result of execution by the TEE. Actually, a plurality of smart contracts can be deployed in the TEE, and the TEE can generate a separate pair of public and private keys for each smart contract. Therefore, each deployed smart contract can have an ID (for example, a public key corresponding to the smart contract or a character string generated based on the public key), and a result of execution of each smart contract can also be signed by using a private key that is properly stored in the TEE and corresponding to the smart contract. As such, it can be proved that a result is a result of execution of a specific contract in the off-chain privacy computing node. As such, execution results of different contracts can be signed by different private keys. Only a corresponding public key can verify the signature, that is, if a corresponding public key cannot verify the signature, it cannot be proved that the result is an execution result of a corresponding contract. Therefore, it is equivalent to that an identity is assigned to the contract deployed in the off-chain privacy computing node by using a pair of public and private keys. The previous description uses the off-chain privacy contract as an example. The on-chain privacy contract is similar, and can also have an identity, that is, have a pair of public and private keys.

Subsequently, the off-chain privacy computing node can invoke the deployed off-chain contract. Specifically, when the deployed off-chain contract is invoked, a bytecode of the deployed contract can be loaded and executed in the off-chain trusted execution environment, and an execution result can be fed back to an invoker of the contract, or fed back to a recipient specified in the contract or a recipient specified in a transaction for invoking the contract, or fed back to the blockchain node by using the oracle mechanism. The execution result fed back to the blockchain node by using the oracle mechanism can be further fed back to the recipient specified in the on-chain contract or to the recipient specified in the transaction for invoking the on-chain contract via the setting of the on-chain contract.

In addition, the execution result of the off-chain privacy computing node can be output after being encrypted by using a key. For example, in an asymmetric encryption method, a public key used for encryption can be a public key in a pair of public and private keys negotiated in the previously-mentioned challenge process, or can be sent by a challenger to the off-chain privacy computing node after being generated by using the previously-mentioned DIS service. The challenger here can be the financial institution in some embodiments of the present specification, or can be the sales agency. Therefore, in the previously-mentioned method, it can be ensured that all data entering or exiting the off-chain privacy computing node is encrypted, so as to ensure security in a data transmission process. Similarly, data entering the off-chain privacy computing node can be signed by a sender by using a key of the sender. The principles in the subsequent similar steps are the same.

As such, by using a second smart contract deployed by the privacy computing unit, an invoking request sent by the financial institution can be received, and the data sharing request is sent to the sales agency in response to the invoking request. The data sharing request is signed by the privacy computing unit/the second smart contract, and correspondingly, the sales agency can verify the signature by using the public key of the privacy computing unit/the second smart contract.

The sales agency can locally search for the user basic data corresponding to the user ID in the sent data sharing request. Further, the privacy computing unit can obtain, from the sales agency, the encrypted user basic data corresponding to the user ID, and decrypt the encrypted user basic data.

The blockchain platform can issue a trigger instruction to invoke the first smart contract to perform verification processing on the user basic data. The invoking instruction can indicate a storage address of the user basic data, and the storage address can be an address on a blockchain, or can be an address off a blockchain. When the first smart contract is being executed, encrypted user basic data can be obtained from the storage location. When the user basic data is stored off the blockchain, the user basic data can be stored at a secure address of the privacy computing unit. In addition, when the user basic data is stored off the blockchain, the data sharing request sent by the second institution and including the user ID and the first encrypted data sent by the first institution can be further obtained by using an oracle mechanism. Specifically, the data sharing request and the user basic data can be respectively obtained from the sales agency and the financial institution.

The user basic data can be encrypted. As described above, an encryption key can use a public key of the first smart contract. Further, the privacy computing unit can obtain the encrypted user basic data corresponding to the user ID and decrypt the encrypted user basic data, so as to execute the first smart contract based on an obtained parameter, and perform matching on the decrypted user basic data. As described above, the input user ID can also be encrypted. Correspondingly, the first smart contract can also be decrypted to obtain a plaintext of the user ID.

To improve security in a data transmission process, before initiating a transaction for invoking the deployed first smart contract to the privacy computing unit, the blockchain platform can challenge the privacy computing unit, so it can be determined that the identity of the privacy computing unit is trustworthy. Or the first smart contract can create a DID by using the previously-mentioned DIS system, and the DIS system can send the DID and the public key of the first smart contract to the blockchain platform for storage. Most public keys can be included in a DIDdoc, which can be stored in the blockchain platform. The DIS creates the DID for the financial institution based on the public key sent by the first smart contract. For example, the DID is created after the public key of the financial institution is calculated by using the hash function, or can be created based on other information of the first smart contract (which can include the public key or not include the public key). The latter case may need the first smart contract to provide information other than the public key. Then, the first smart contract can provide a verification function, so as to prove to another party that itself is a first smart contract. A specific process is similar to the previously-mentioned process, and details are not described. In addition, it can be understood that the first smart contract and the second smart contract can be the same contract. As such, pairs of public and private keys of the first smart contract and the second smart contract can be the same, or can be equivalent to a pair of public and private keys of the privacy computing unit when the privacy computing unit includes only one smart contract.

After the first smart contract obtains the user basic data, the first smart contract can be executed, so as to perform KYC verification based on the basic data, for example, perform matching on the decrypted user data, so as to obtain a verification result. For example, for an individual user, verification is specifically:

whether the name format is correct, for example, whether the name is composed of 2-5 Chinese characters;

whether the gender format is correct, such as male or female;

whether the mobile phone number is correct, such as 11 digits, and begins with fields such as 13, 15, 17, 18, and 19;

whether the contact address is correct, for example, whether the contact address is a string of words containing the province/autonomous region/municipality to the street doorplate number; etc.

As such, a KYC verification result can be obtained. The verification result is specifically, for example, {user ID, KYC result}. The KYC result is, for example, passed or failed.

Figure 5:
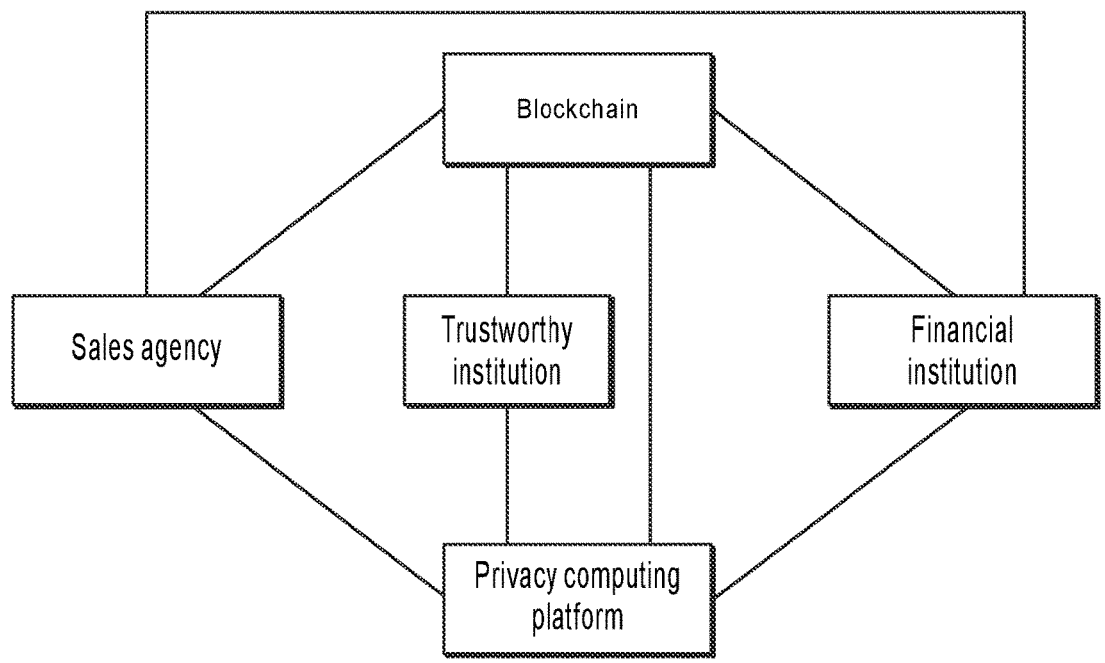
FIG. 5 is a schematic diagram illustrating a system architecture including a trustworthy institution, according to some embodiments of the present specification.

In addition, the previously-mentioned verification process only verifies a format of the user basic data, that is, whether a data format is matched. In addition, authenticity of the user basic data can be verified. Based on the structure in FIG. 5, authenticity verification can be performed by using the following method:

obtaining second encrypted data sent by a trustworthy institution and obtained after trusted data corresponding to the user ID is encrypted;

decrypting the second encrypted data by using a public key of the trustworthy institution to obtain the trusted data; and verifying the user basic information based on the trusted data.

In practice, the trustworthy institution can be a public security organization, and the public security organization stores identity information of each citizen, such as name, gender, nationality, identity card number, address, and birth date. The identity information can be considered as authentic, and can be referred to as trusted data. Therefore, in a case that the user basic data satisfies a corresponding format requirement, authenticity verification can be performed, based on the trusted data, on the user basic data submitted by the sales agency.

Specifically, the privacy computing unit can initiate a trusted data acquisition request to the trustworthy institution, where the trusted data acquisition request can include a user ID corresponding to trusted data that needs to be obtained. Then, to verify the identity of the privacy computing unit, the trustworthy institution can initiate an on-chain or off-chain challenge. For details, refer to a specific step that the sales agency or the financial institution challenges the privacy computing unit. Details are not described again. In addition, the privacy computing unit can further proactively prove its identity to the trustworthy institution. For example, the trusted data acquisition request includes self-recommendation information of the privacy computing unit and verification information of an authority organization. The trustworthy institution determines, by using the previously-mentioned information, whether the privacy computing unit is trustworthy, and if the privacy computing unit is trustworthy, sends the trusted data corresponding to the user ID to the privacy computing unit. In addition, a third smart contract can further be used to obtain the second encrypted data sent by the trustworthy institution and obtained after the trusted data corresponding to the user ID is encrypted.

The third smart contract can create a DID by using the previously-mentioned DIS system, and the DIS system can send the DID and the public key of the third smart contract to the blockchain platform for storage. Most public keys can be included in a DIDdoc, which can be stored in the blockchain platform. The DIS creates the DID for the trustworthy institution based on the public key sent by the third smart contract. For example, the DID is created after the public key of the trustworthy institution is calculated by using the hash function, or can be created based on other information of the third smart contract (which can include the public key or not include the public key). The latter case may need the third smart contract to provide information other than the public key. Then, the third smart contract can provide a verification function, so as to prove to another party that itself is a third smart contract. A specific process is similar to the previously-mentioned process, and details are not described. In addition, it can be understood that the third smart contract and the second smart contract or the first smart contract can be the same contract. As such, pairs of public and private keys of the third smart contract and the second smart contract or the first smart contract can be the same, or can be equivalent to a pair of public and private keys of the privacy computing unit when the privacy computing unit includes only one smart contract.

Step 230: Send the verification result to the second institution.

As described above, the matching result is, for example, {user ID, KYC result}, and the KYC result is, for example, passed or failed. That the privacy computing platform sends the verification result to the financial institution includes directly sending the verification result to the financial institution, or can include sending the verification result to a specified storage service medium, which is subsequently pulled by the financial institution from the storage service medium.

In addition, the privacy computing unit can further send a proof of the matching result to the blockchain. The proof of the matching result can include a verifiable claim (VC) signed by the privacy computing unit. The VC is also an important application in the DID. The VC can be stored on the blockchain platform. For example, content of the VC includes that user basic data corresponding to a user ID/some user IDs has been matched by the privacy computing unit based on a predetermined rule, and is signed by the privacy computing unit; or includes a hash value of the matching result, which is signed by the privacy computing unit. After a process similar to S410 to S430, the privacy computing unit can store its DIDdoc on the blockchain.

When examining the KYC verification result on the user by the financial institution, a third institution such as a regulatory organization can verify the VC by using the blockchain in addition to obtaining the matching result from the financial institution. Specifically, when obtaining the public key in the DIDdoc of the privacy computing unit from the blockchain, and verifying the matching result of the user ID of the financial institution, the regulatory organization can further verify the signature of the VC by using the public key of the privacy computing unit, so as to acknowledge that the VC is issued by the privacy computing unit and is complete, that is, the VC is not tampered with. As such, authenticity acknowledgement of the KYC verification result provided by the financial institution can be improved based on a non-tampering feature of the blockchain platform and trustworthiness of a signing institution. The trustworthiness of the signing institution, that is, the trustworthiness of the privacy computing unit/first smart contract, can be implemented by auditing the identity of the privacy computing unit and the contract code deployed therein. The identity of the privacy computing unit is audited, for example, the previously-mentioned challenge initiation process can verify that the identity of the privacy computing unit is trustworthy.

It should be understood that, in the method described in one or more embodiments of the present specification, sequences of some steps in the method can be exchanged with each other based on an actual requirement, or some steps in the method can be omitted or deleted.

In the method in FIG. 2, by using the solution in the previously-mentioned embodiment, an institution that originally does not have the capability to perform anti-money laundering work can be empowered, so such an institution can have a KYC result of a user who purchases a financial product of the institution, thereby satisfying a specified anti-money laundering audit obligation, and improving an overall KYC verification capability of the industry. In addition, a blockchain node proactively starts a smart contract at a timed moment to complete a timed task, so an initiator of the timed task does not need to submit a blockchain transaction at a timed moment to the blockchain network to invoke the smart contract. On one hand, the blockchain node does not need to receive a blockchain transaction invoking the smart contract, so the blockchain node can reduce operations (for example, consensus, anti-replay check, and anti-double-spending check) of processing the blockchain transaction invoking the target smart contract, resource consumption of the blockchain node can be reduced, and efficiency of completing the timed task can be improved. On the other hand, the blockchain network automatically starts the smart contract to complete the timed task, thereby simplifying operations of the initiator of the timed task and improving user experience.

Figure 6:
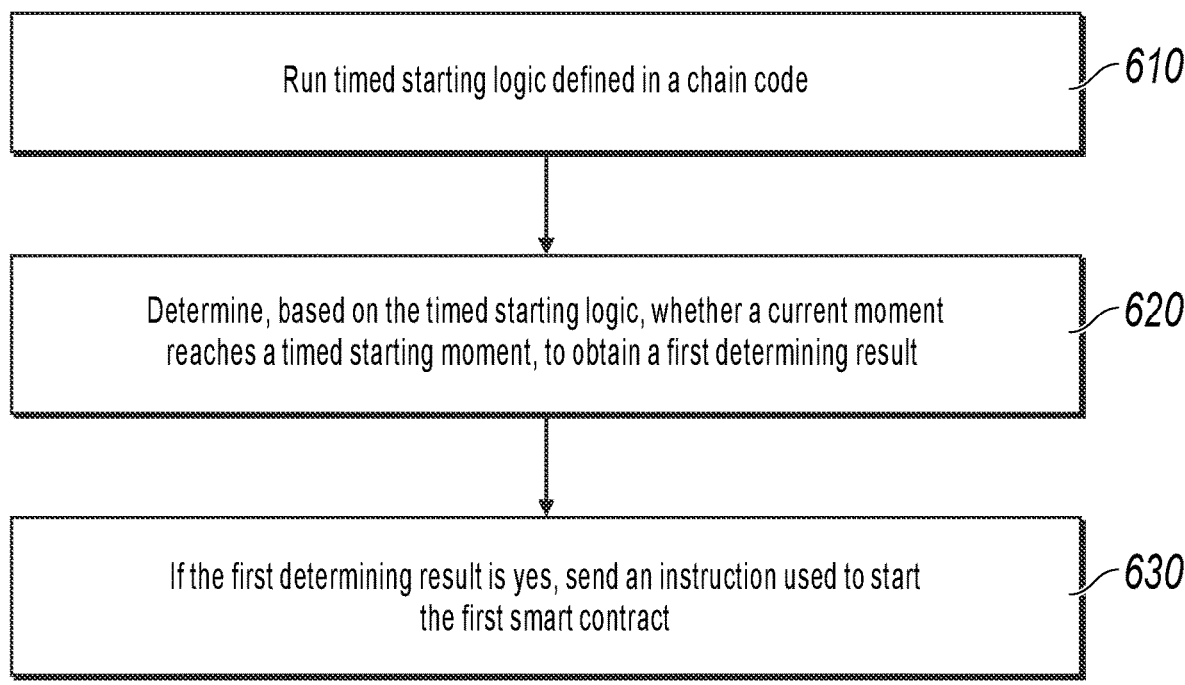
FIG. 6 is a schematic flowchart illustrating a method for starting a smart contract, according to some embodiments of the present specification.

In another embodiment, a method for starting a smart contract at a timed moment by using a chain code is provided. As shown in FIG. 6, the method includes the following steps:

Step 610: Run timed starting logic defined in a chain code.

Step 620: Determine, based on the timed starting logic, whether a current moment reaches a timed starting moment, to obtain a first determining result.

Step 630: If the first determining result is yes, send an instruction used to start a first smart contract, where the first smart contract is used to perform verification processing on encrypted user basic data, and send a verification result to a specified address.

In some embodiments, when a blockchain network is built, a chain code of the blockchain network can be configured in a node device, so the node device runs the chain code as a blockchain node in the blockchain network. A timed starting logic can be defined in the chain code of the blockchain network in advance, so that the blockchain node can proactively start a smart contract deployed on the blockchain network, and does not need to execute the smart contract by responding to a received blockchain transaction used to invoke the smart contract. In this case, the blockchain node can complete the previously-mentioned operation of proactively starting the smart contract at a timed moment by using the timed starting logic when executing the chain code.

Specifically, the timed starting logic can be used to: determine a starting moment of the target smart contract, and start the target smart contract when the current moment reaches the starting moment. The target smart contract can be understood as a smart contract that the blockchain node can proactively start at a timed moment, and a contract code used to complete a timed task is defined in the smart contract. It is worthwhile to note that the target smart contract can still be deployed to the blockchain network in the previously-mentioned related technology.

It can be understood that the blockchain node proactively starts the smart contract at a timed moment to complete the timed task, so an initiator of the timed task does not need to submit a blockchain transaction at a timed moment to the blockchain network to invoke the smart contract. On one hand, the blockchain node does not need to receive a blockchain transaction invoking the smart contract, so the blockchain node can reduce operations (for example, consensus, anti-replay check, and anti-double-spending check) of processing the blockchain transaction invoking the target smart contract, resource consumption of the blockchain node can be reduced, and efficiency of completing the timed task can be improved. On the other hand, the blockchain network automatically starts the smart contract to complete the timed task, thereby simplifying operations of the initiator of the timed task and improving user experience.

In some embodiments, the blockchain node runs the chain code to determine a smart contract that needs to be proactively started at a timed moment, that is, the target smart contract.

In one case, information about the target smart contract can be recorded in the chain code, that is, the information about the target smart contract is written into the chain code when the chain code is developed. For example, a contract address of the target smart contract can be written into the chain code. Based on the information about the target smart contract recorded in the chain code, the blockchain node can determine the target smart contract by running the chain code. By recording the information about the target smart contract in the chain code, the information about the target smart contract can be effectively prevented from being maliciously tampered with.

In another case, the information about the target smart contract (there can be a plurality of target smart contracts) can be recorded in a specific predetermined blockchain account, and information about the predetermined blockchain account is recorded in the chain code, that is, the information about the predetermined blockchain account is written into the chain code when the chain code is developed. For example, the contract address of the target smart contract can be recorded in the predetermined blockchain account, and an account address of the predetermined blockchain account is written into the chain code. Based on the information about the predetermined blockchain account recorded in the chain code, the blockchain node can determine the blockchain account by running the chain code, so as to read the contract address of the target smart contract from the blockchain account. By using the previously-mentioned method of recording the target smart contract by using the blockchain account, it is convenient to update a list of smart contracts that need to be proactively started at a timed moment, so the blockchain network is controlled to complete the timed task more flexibly.

In the method of FIG. 6, the blockchain node proactively starts the smart contract at a timed moment to complete the timed task, so an initiator of the timed task does not need to submit a blockchain transaction at a timed moment to the blockchain network to invoke the smart contract. On one hand, the blockchain node does not need to receive a blockchain transaction invoking the smart contract, so the blockchain node can reduce operations (for example, consensus, anti-replay check, and anti-double-spending check) of processing the blockchain transaction invoking the target smart contract, resource consumption of the blockchain node can be reduced, and efficiency of completing the timed task can be improved. On the other hand, the blockchain network automatically starts the smart contract to complete the timed task, thereby simplifying operations of the initiator of the timed task and improving user experience.

Specifically, the sending an instruction used to start a first smart contract can specifically include:

obtaining contract information of the first smart contract;

determining, based on the contract information, whether the first smart contract is an on-chain contract, to obtain a second determining result;

if the second determining result is yes, sending an instruction used to start the first smart contract deployed on a blockchain.

if the second determining result is no, sending an instruction for starting the first smart contract deployed on an off-chain node, where the instruction is used to invoke the first smart contract deployed on the off-chain node by using an oracle mechanism.

When whether the contract is an on-chain contract is determined, the contract code can be obtained from a predetermined block storing the first smart contract or a predetermined smart contract based on the information about the first smart contract. If the contract code is obtained, it indicates that the first smart contract is an off-chain contract.

Specifically, in the blockchain network, the blockchain account can include an external account, a contract account, etc. The external account is usually owned by a user (an individual or an institution), while the contract account corresponds to the smart contract deployed in the blockchain. Structures of various accounts are similar, for example, can include the Nonce field, the Balance field, the Code field, and the Storage field. The value of the Nonce field of each account starts from 0, and the value of the Nonce field increases continuously with transactions initiated by the corresponding account, so the Nonce value of each transaction initiated by the account is different, thereby avoiding replay attacks. The Balance field is used to store the balance. The Storage field is used to store the content of the account. The Code field is used to store the code of the smart contract, so the Code field of the external account is usually null. That is, if the code of the first smart contract cannot be found, it indicates that the first smart contract is an off-chain contract.

In some embodiments, the first smart contract can be deployed on the blockchain network, that is, belongs to an on-chain contract; or can be deployed in an off-chain node (which does not belong to the blockchain network and is an off-chain device) that is different from the blockchain node, that is, an off-chain contract. The following respectively describes processes of starting the target smart contract in the previously-mentioned two cases.

In a case that the first smart contract is an on-chain contract, after determining that the target smart contract needs to be started, the blockchain node can read the contract code of the target smart contract, so as to execute the read contract code. For the previously-mentioned process, refer to a related part of the embodiments shown in FIG. 2. Details are omitted here for simplicity.

Further, for data to be processed in a smart contract, which is different from the related technology, that is indicated by a blockchain transaction which invokes the smart contract, there is no blockchain transaction invoking the target smart contract in the process of starting the smart contract in the present specification, that is, data to be processed of the target smart contract does not need to be indicated by the blockchain transaction. In one case, the data to be processed of the target smart contract is off-chain data. Therefore, the blockchain node can obtain the off-chain data by using an oracle mechanism, so as to execute contract code to process the obtained off-chain data. In another case, the data to be processed of the target smart contract is status data of the target smart contract. Therefore, the blockchain node can obtain the status data stored in the contract account of the target smart contract, so as to execute the contract code to process the obtained status data.

In a case that the target smart contract is an off-chain contract, after determining that the first smart contract needs to be started, the blockchain node can invoke, by using the oracle mechanism, the first smart contract deployed in the off-chain node, so as to instruct the off-chain node to execute the first smart contract, and feed back, to the blockchain node by using the oracle mechanism, an execution result obtained by executing the first smart contract.

When the first smart contract that is to be started at a timed moment is used to implement relatively complex logic, because frequency of timed starting is relatively high, a process that the blockchain node executes the contract code of the target smart contract by using a virtual machine consumes relatively more computing resources, and because all nodes in the blockchain network need to execute the contract code of the target smart contract, consumption of computing resources increases exponentially as a quantity of nodes increases. To solve the previously-mentioned problem, the first smart contract that needs to be started at a timed moment is deployed in an off-chain node, so as to avoid a case that all the blockchain nodes need to execute the contract code of the target smart contract, and the blockchain node can obtain an execution result from the off-chain node, thereby effectively reducing resource consumption on the blockchain.

Optionally, the determining whether a current moment reaches a timed starting moment can specifically include:

monitoring in real time a new block generated on a blockchain;

obtaining timestamp information of the block after the block is detected;

determining the current moment based on the timestamp information; and determining whether the current moment reaches the timed starting moment.

As an example embodiment, a moment at which a new block is generated in the blockchain (that is, a moment at which a latest block is generated) can be used as a proof to determine whether the current moment reaches the starting moment of the first smart contract. Specifically, when a new block is generated in the blockchain, a moment at which the block is generated is recorded in a block header of the block as a timestamp. Therefore, when it is detected that a new block is generated in the blockchain, it can be determined, based on a relationship between a timestamp included in the new block and the starting moment, whether the current moment reaches the starting moment. For example, a timestamp can be read from a block header of a new block, and then the read timestamp is compared with the starting moment to determine a relationship between the read timestamp and the starting moment. For example, when the timestamp is the same as the starting moment, it is determined that the first smart contract needs to be started (it is understood that the current moment reaches the starting moment). Or when the difference between the timestamp and the starting moment falls within a predetermined duration threshold, it is determined that the target smart contract needs to be started. Certainly, a specific implementation that the timestamp is compared with the starting moment to determine whether the current moment reaches the starting moment can be flexibly set based on an actual situation. This is not limited in the present specification. It is worthwhile to note that, the previously-mentioned logic that determines whether the current moment reaches the starting moment can be written into the chain code, for example, written into the timed starting logic of the chain code.

In some embodiments, the blockchain node can perform, by running the timed starting logic, an operation of determining whether the current moment reaches the starting moment, and can perform the operation in "real-time". Specifically, a timer with predetermined duration can be configured, and the timed starting logic can be used to start the timer. After the timer expires, the first smart contract is started, and the timer is reset. This solution is suitable for proactively starting the first smart contract at a fixed time interval for KYC verification. For example, the timer is timed as 4 hours, 12 hours, or 24 hours. Then, the first smart contract is started every 4 hours, 12 hours, or 24 hours.

In some embodiments, the blockchain node can directly obtain time recorded by the blockchain node to determine the current moment (which is synchronized with time recorded by another blockchain node), or obtain the current moment from the network, so as to compare the determined current moment with the starting moment, so as to start the on-chain contract when the current moment reaches the starting moment.

In another embodiment, the starting moment of the first smart contract can be set based on a block height (a block number of a block). For example, a generation moment of a block with a predetermined block height is used as a starting moment, that is, when the blockchain network generates a block with the predetermined block height, it is determined that the starting moment arrives, and the target smart contract needs to be started. The predetermined block height can be specifically set to a block height of one or more specific values (for example, a block number 50 or a block number 99), or can be set to a block height that satisfies a specific condition (for example, integer multiples of 100 or integer multiples of 50). This is not limited in the present specification.

Figure 7:
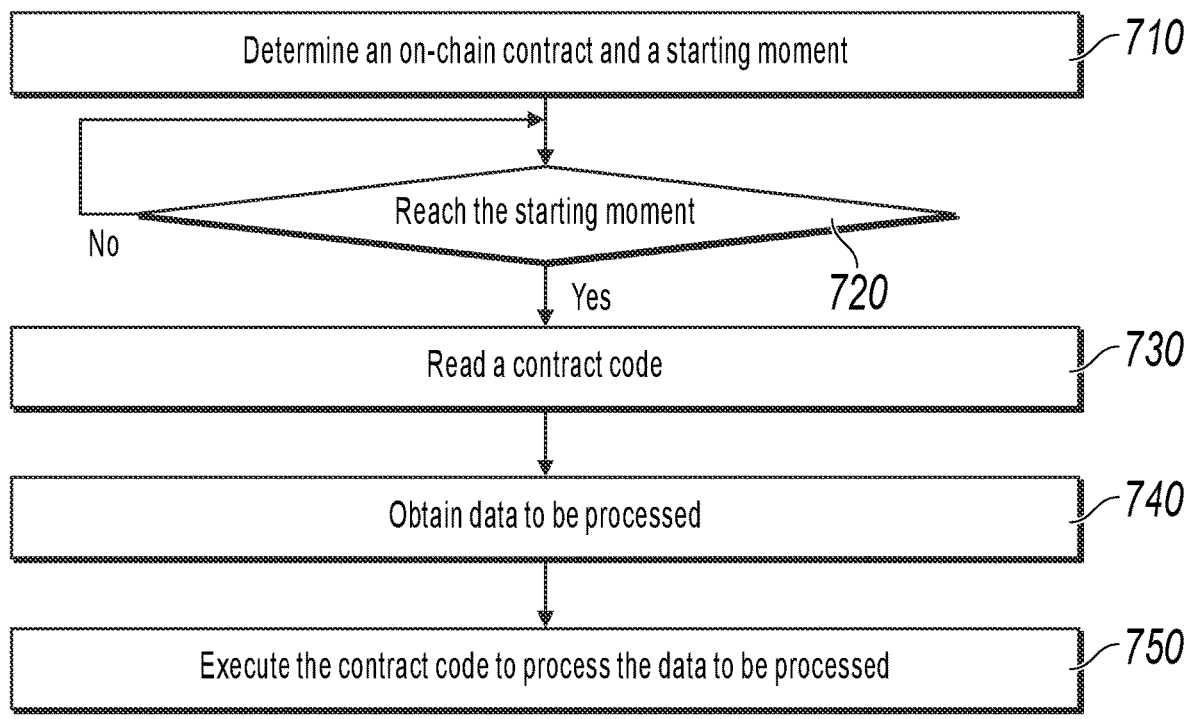
FIG. 7 is a flowchart illustrating a method for starting an on-chain contract, according to some embodiments of the present specification.

Referring to FIG. 7, FIG. 7 is a flowchart illustrating a method for starting an on-chain contract, according to some embodiments of the present specification. As shown in FIG. 7, the method is applied to a blockchain node and can include the following steps:

Step 710: Determine an on-chain contract and a starting moment.

In some embodiments, for a specific implementation process of determining the on-chain contract that needs to be proactively started at a timed moment and the starting moment, references can be made to related parts of the above embodiments shown in FIG. 2 and FIG. 6, and details are omitted here for simplicity.

Step 720: Determine whether a current moment reaches the starting moment; if the current moment reaches the starting moment, perform step 730; otherwise, perform step 720.

In some embodiments, whenever a new block is generated in a blockchain, a timestamp of the new block can be used as a proof to determine whether the current moment reaches the starting moment of the on-chain contract. For example, whenever a new block is detected in the blockchain, a timestamp can be read from a block header of the new block, and then the read timestamp is compared with the starting moment to determine a relationship between the read timestamp and the starting moment. For example, when the timestamp is the same as the starting moment, it is determined that the on-chain contract needs to be started (it is understood that the current moment reaches the starting moment). Or when the difference between the timestamp and the starting moment falls within a predetermined duration threshold, it is determined that the on-chain contract needs to be started. Certainly, a specific implementation method that the time stamp is compared with the starting moment to determine whether the current moment reaches the starting moment can be flexibly set according to an actual situation. This is not limited in the present specification.

In some embodiments, the blockchain node can perform step 720 "in real time".

Step 730: Read a contract code of the on-chain contract.

In some embodiments, because the on-chain contract is deployed in the blockchain network, the blockchain node can directly read the contract code of the on-chain contract.

Step 740: Obtain data to be processed.

Step 750: Execute the contract code to process the data to be processed.

In some embodiments, for data to be processed in a smart contract, which is different from the related technology, that is indicated by a blockchain transaction which invokes the smart contract, there is no blockchain transaction invoking the on-chain contract in the process of starting the on-chain contract in the present specification, that is, the data to be processed of the on-chain contract does not need to be indicated by the blockchain transaction. In one case, the data to be processed of the on-chain contract is off-chain data. Therefore, the blockchain node can obtain the off-chain data by using an oracle mechanism, so as to execute contract code to process the obtained off-chain data. In another case, the data to be processed of the on-chain contract is status data of the on-chain contract. Therefore, the blockchain node can obtain the status data stored in the contract account of the on-chain contract, so as to execute the contract code to process the obtained status data.

Figure 8:
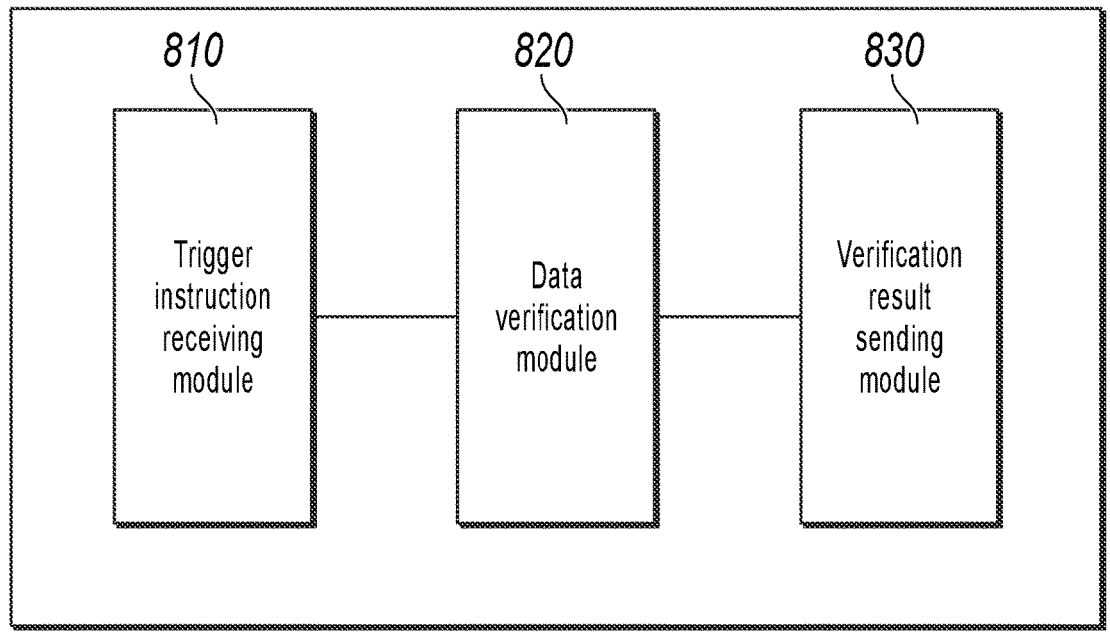
FIG. 8 is a schematic structural diagram illustrating a data verification apparatus corresponding to FIG. 2, according to some embodiments of the present specification.

Based on the same idea, some embodiments of the present specification further provide an apparatus that corresponds to the previously-mentioned method. FIG. 8 is a schematic structural diagram illustrating a data verification apparatus corresponding to FIG. 2, according to some embodiments of the present specification. The apparatus is applied to a privacy computing unit. As shown in FIG. 8, the apparatus can include:

a trigger instruction receiving module 810, configured to receive a trigger instruction that is sent by a blockchain platform based on timed starting logic defined in a chain code;

a data verification module 820, configured to perform verification processing on user basic data based on the trigger instruction to obtain a verification result, where the user basic data is obtained after first encrypted data sent by a first institution is decrypted, and the user basic data is user basic data obtained based on a user ID included in a data sharing request sent by a second institution; and a verification result sending module 830, configured to send the verification result to the second institution.

Optionally, the privacy computing unit is deployed on a node on the blockchain platform, or the privacy computing unit is deployed on a node off the blockchain platform.

Optionally, the trigger instruction is sent by a node on the blockchain platform to a privacy computing unit on a node off the blockchain platform by using an oracle mechanism, and is used to start invoking a first smart contract deployed on the privacy computing unit.

Optionally, the trigger instruction is used to start invoking a first smart contract deployed on the blockchain platform.

Optionally, the first institution is a sales agency, and the second institution is a financial institution.

Optionally, the user ID can include:

an account registered by a user at the first institution; or an account allocated to a user by a system of the first institution when the user initiates a purchase operation at the first institution.

Optionally, the user ID can include:

a digest value obtained through hash calculation on one or more pieces of information in the user basic data.

Optionally, the digest value obtained through hash calculation on one or more pieces of information of the user basic data further includes a digest value obtained by a salting operation.

Optionally, the apparatus can further include:

a data acquisition module, configured to obtain, by using an oracle mechanism, a data sharing request sent by the second institution and including a user ID and the first encrypted data sent by the first institution, where the first encrypted data is encrypted user basic data corresponding to the user ID.

Optionally, the apparatus can further include:

a data sharing request acquisition module, configured to obtain a data sharing request sent by the second institution and including a user ID;

a first encrypted data acquisition module, configured to obtain, based on the data sharing request, the first encrypted data sent by the first institution, where the first encrypted data is encrypted user basic data corresponding to the user ID; and a decryption module, configured to invoke a first smart contract to decrypt the first encrypted data.

Optionally, the first encrypted data acquisition module can specifically include:

a data sharing request sending unit, configured to invoke a second smart contract, and send the data sharing request to the first institution; and a user basic data acquisition unit, configured to obtain the encrypted user basic data sent by the first institution and corresponding to the user ID.

Optionally, the first encrypted data acquisition module can further include:

an identity proving unit, configured to: before the encrypted user basic data sent by the first institution and corresponding to the user ID is obtained, prove an identity of the privacy computing unit to the first institution.

Optionally, the identity proving unit is specifically configured to send a remote attestation report to the first institution, where the remote attestation report includes self-recommendation information of the privacy computing unit about a TEE and verification information of an authority organization for the self-recommendation information.

Optionally, the data sharing request sending unit can be specifically configured to:

invoke the second smart contract to send the data sharing request signed by using the privacy computing unit to the first institution; or invoke the second smart contract to send the data sharing request signed by using the second smart contract to the first institution.

Optionally, the user ID included in the data sharing request is sent by the first institution to the second institution.

Optionally, the data verification module 820 can be specifically configured to invoke the first smart contract to perform verification processing on the user basic data.

Optionally, the data verification module 820 can specifically include:

a second encrypted data acquisition unit, configured to obtain second encrypted data sent by a trustworthy institution and obtained after trusted data corresponding to the user ID is encrypted;

a second encrypted data decryption unit, configured to decrypt the second encrypted data by using a public key of the trustworthy institution to obtain the trusted data; and a verification unit, configured to verify the user basic information based on the trusted data.

Optionally, the apparatus can further include:

a verification result proof sending module, configured to send a proof of the verification result to a blockchain.

Optionally, the verification result proof sending module is specifically configured to send the proof of the verification result to the blockchain by using an oracle mechanism.

Optionally, the proof of the verification result includes a verifiable claim signed by the privacy computing unit or the first smart contract.

Optionally, when verifying the verification result, a third institution verifies a signature of the verifiable claim by using a public key of the privacy computing unit or the first smart contract.

Based on the same idea, some embodiments of the present specification further provide a schematic structural diagram illustrating an apparatus for starting a smart contract corresponding to FIG. 6. The apparatus is applied to a privacy computing unit. The apparatus includes:

a code running module, configured to run timed starting logic defined in a chain code;

a result determining module, configured to determine, based on the timed starting logic, whether a current moment reaches a timed starting moment, to obtain a first determining result; and an instruction sending module, configured to: if the first determining result is yes, send an instruction used to start a first smart contract, where the first smart contract is used to perform verification processing on encrypted user basic data, and send a verification result to a specified address.

Optionally, the instruction sending module can specifically include:

a contract information acquisition unit, configured to obtain contract information of the first smart contract;

a result determining unit, configured to determine, based on the contract information, whether the first smart contract is an on-chain contract, to obtain a second determining result; and a first instruction sending determining unit, configured to: if the second determining result is yes, send an instruction used to start the first smart contract deployed on a blockchain.

Optionally, the instruction sending module can further include:

a second instruction sending unit, configured to: if the second determining result is no, send an instruction for starting the first smart contract deployed on an off-chain node, where the instruction is used to invoke the first smart contract deployed on the off-chain node by using an oracle mechanism.

Optionally, the determining whether a current moment reaches a timed starting moment can specifically include:

monitoring in real time a new block generated on a blockchain;

obtaining timestamp information of the block after the block is detected;

determining the current moment based on the timestamp information; and determining whether the current moment reaches the timed starting moment.

Optionally, a verification result obtained after the off-chain node executes the first smart contract is fed back by the off-chain node to the blockchain by using the oracle mechanism.

Based on the same idea, some embodiments of the present specification further provide devices that correspond to the previously-mentioned methods.

Figure 9:
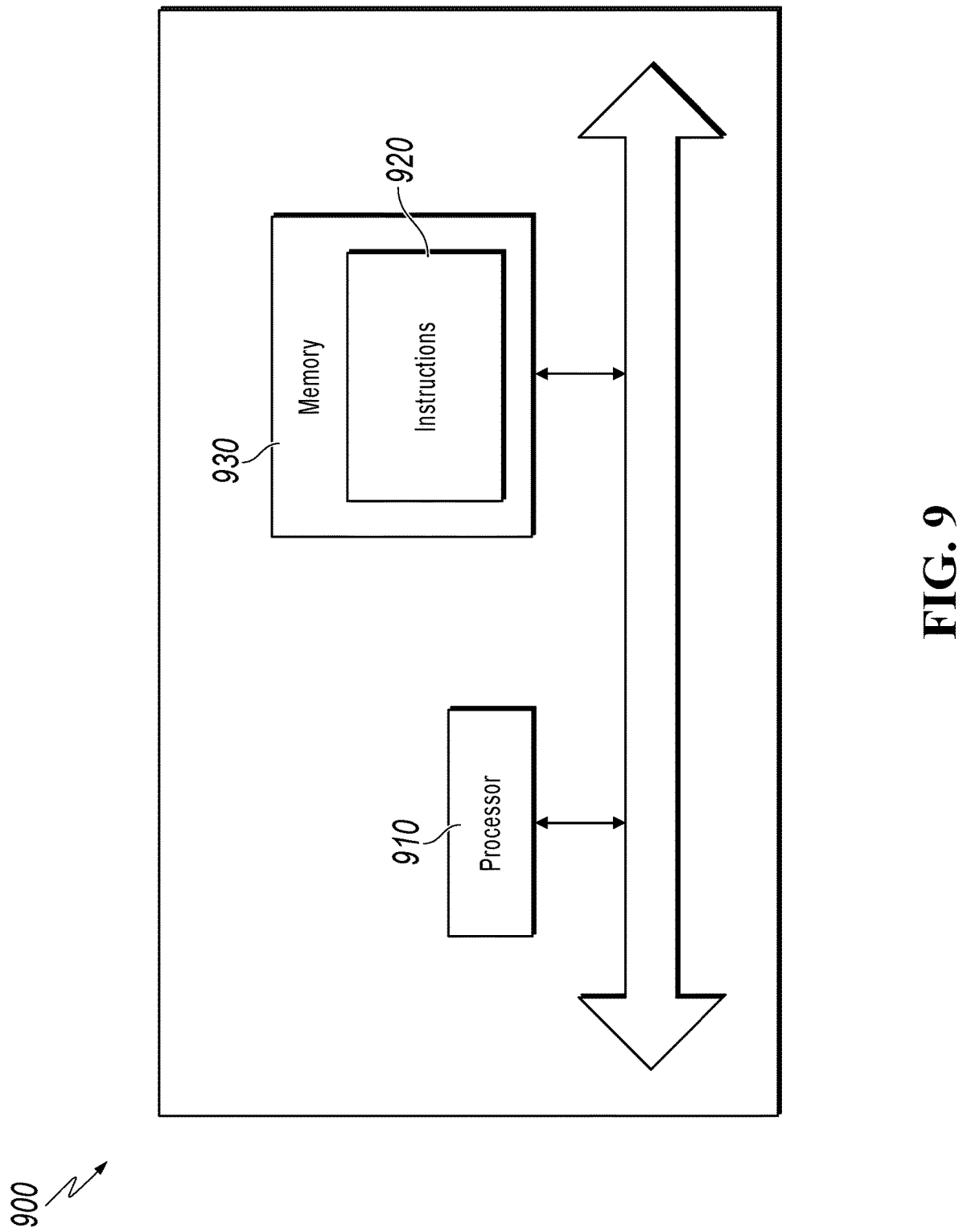
FIG. 9 is a schematic structural diagram illustrating a data verification device corresponding to FIG. 2, according to some embodiments of the present specification.

FIG. 9 is a schematic structural diagram illustrating a data verification device corresponding to FIG. 2, according to some embodiments of the present specification. As shown in FIG. 9, the device 900 can include:

at least one processor 910; and a memory 930 communicatively connected to the at least one processor;

where the memory 930 stores instructions 920 that can be executed by the at least one processor 910, and the instructions are executed by the at least one processor 910, to enable the at least one processor 910 to:

receive a trigger instruction that is sent by a blockchain platform based on timed starting logic defined in a chain code;

perform verification processing on user basic data based on the trigger instruction to obtain a verification result, where the user basic data is obtained after first encrypted data sent by a first institution is decrypted, and the user basic data is user basic data obtained based on a user ID included in a data sharing request sent by a second institution; and send the verification result to the second institution.

Some embodiments of the present specification provide a device for starting a smart contract, including:

at least one processor; and a memory communicatively connected to the at least one processor; where the memory stores instructions that can be executed by the at least one processor, and the instructions are executed by the at least one processor to enable the at least one processor to:

run timed starting logic defined in a chain code;

determine, based on the timed starting logic, whether a current moment reaches a timed starting moment, to obtain a first determining result; and if the first determining result is yes, send an instruction used to start a first smart contract, where the first smart contract is used to perform verification processing on encrypted user basic data, and send a verification result to a specified address.

Based on the same idea, some embodiments of the present specification further provide a computer readable medium corresponding to the previously-mentioned method. The computer readable medium stores computer readable instructions, and the computer readable instructions can be executed by a processor to implement the following method:

receiving a trigger instruction that is sent by a blockchain platform based on timed starting logic defined in a chain code;

performing verification processing on user basic data based on the trigger instruction to obtain a verification result, where the user basic data is obtained after first encrypted data sent by a first institution is decrypted, and the user basic data is user basic data obtained based on a user ID included in a data sharing request sent by a second institution; and sending the verification result to the second institution.

Or the computer readable instructions can be executed by the processor to implement the following method:

running timed starting logic defined in a chain code;

determining, based on the timed starting logic, whether a current moment reaches a timed starting moment, to obtain a first determining result; and if the first determining result is yes, sending an instruction used to start a first smart contract, where the first smart contract is used to perform verification processing on encrypted user basic data, and send a verification result to a specified address.

The embodiments in the present specification are described in a progressive way. For same or similar parts of the embodiments, references can be made to the embodiments. Each embodiment focuses on a difference from other embodiments.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, the current improvement for many method procedures can be considered as a direct improvement of a hardware circuit structure. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the previously-mentioned several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously-mentioned embodiments can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above apparatuses are described respectively in terms of their functions. Certainly, when the present specification is implemented, a function of each unit can be implemented in one or more pieces of software and/or hardware.

A person skilled in the art should understand that embodiments of the present disclosure can be provided as methods, systems, or computer program products. Therefore, the present disclosure can use a form of hardware only embodiments, software only embodiments, or embodiments with a combination of software and hardware. Further, the present specification can take a form of a computer program product implemented on one or more computer-usable storage media (including but not limited to disk storage, CD-ROM, and optical storage) containing computer-usable program code.

The present disclosure is described with reference to the flowcharts and/or block diagrams of the method, the device (system), and the computer program product based on the embodiments of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to: a phase change memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. Based on the definition in the present specification, the computer readable medium does not include transitory media such as a modulated data signal and carrier.

It is also worthwhile to note that terms "include", "contain" or any other variant is intended to cover non-exclusive inclusion, so processes, methods, products or devices that include a series of elements include not only those elements but also other elements that are not explicitly listed, or elements inherent in such processes, methods, products or devices. An element described by "includes a . . . " further includes, without more constraints, another identical element in the process, method, product, or device that includes the element.

A person skilled in the art should understand that embodiments of the present specification can be provided as methods, systems, or computer program products. Therefore, the present specification can use a form of hardware only embodiments, software only embodiments, or embodiments with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The previously-mentioned descriptions are embodiments of the present specification, and are not intended to limit the present specification. A person skilled in the art can make various modifications and changes to the present specification. Any modification, equivalent replacement or improvement made within spirit and principles of the present specification shall be included in claims of the present specification.

What is claimed is:

1. A computer-implemented method, comprising:
   receiving, from a blockchain network by a trusted execution environment (TEE) in a blockchain node, a trigger instruction based on a timed starting logic, wherein the timed starting logic identifies a starting time to execute a smart contract, wherein the timed starting logic is comprised in a chain code associated with the blockchain network, and wherein the chain code comprises information of a blockchain account and is executable by the blockchain node to determine the information of the blockchain account;
   retrieving, by the TEE, first encrypted data from a first institution;
   decrypting, by the TEE, the first encrypted data;
   receiving, by the TEE, a data sharing request from a second institution, wherein the data sharing request comprises a user identity corresponding to user basic data;
   retrieving, by the TEE, the user basic data based on the user identity;
   performing, by the TEE, verification processing of the user basic data based on the trigger instruction to obtain a verification result; and
   sending, by the TEE, the verification result to the second institution.

2. The computer-implemented method of claim 1, wherein the trigger instruction invokes the smart contract deployed in the TEE to perform the verification processing of the user basic data.

3. The computer-implemented method of claim 1, wherein the user identity comprises an account registered by a user at the first institution or assigned to the user by the first institution in response to an operation initiated by the user at the first institution.

4. The computer-implemented method of claim 1, comprising:
   invoking, by the TEE, the smart contract to decrypt the first encrypted data.

5. The computer-implemented method of claim 1, comprising:
   invoking, by the TEE, the smart contract to send the data sharing request to the first institution.

6. The computer-implemented method of claim 1, wherein the user identity comprises a digest value obtained through a hash calculation on one or more pieces of information in the user basic data.

7. The computer-implemented method of claim 1, wherein performing the verification processing on the user basic data comprises:
   retrieving, by the TEE, second encrypted data from a trusted institution;

decrypting, by the TEE, the second encrypted data by using a public key of the trusted institution to obtain trusted data; and verifying, by the TEE, user basic data based on the trusted data.

8. A non-transitory, computer-readable medium storing one or more instructions executable by a computer system to perform operations comprising:

receiving, from a blockchain network by a trusted execution environment (TEE) in a blockchain node, a trigger instruction based on a timed starting logic, wherein the timed starting logic identifies a starting time to execute a smart contract, wherein the timed starting logic is comprised in a chain code associated with the blockchain network, and wherein the chain code comprises information of a blockchain account and is executable by the blockchain node to determine the information of the blockchain account;

retrieving, by the TEE, first encrypted data from a first institution;

decrypting, by the TEE, the first encrypted data;

receiving, by the TEE, a data sharing request from a second institution, wherein the data sharing request comprises a user identity corresponding to user basic data;

retrieving, by the TEE, the user basic data based on the user identity;

performing, by the TEE, verification processing of the user basic data based on the trigger instruction to obtain a verification result; and sending, by the TEE, the verification result to the second institution.

9. The non-transitory, computer-readable medium of claim 8, wherein the trigger instruction invokes the smart contract deployed in the TEE to perform the verification processing of the user basic data.

10. The non-transitory, computer-readable medium of claim 8, wherein the user identity comprises an account registered by a user at the first institution or assigned to the user by the first institution in response to an operation initiated by the user at the first institution.

11. The non-transitory, computer-readable medium of claim 8, wherein the operations comprise:

invoking, by the TEE, the smart contract to decrypt the first encrypted data.

12. The non-transitory, computer-readable medium of claim 8, wherein the operations comprise:

invoking, by the TEE, the smart contract to send the data sharing request to the first institution.

13. The non-transitory, computer-readable medium of claim 8, wherein the user identity comprises a digest value obtained through a hash calculation on one or more pieces of information in the user basic data.

14. The non-transitory, computer-readable medium of claim 8, wherein performing the verification processing on the user basic data comprises:

retrieving, by the TEE, second encrypted data from a trusted institution;

decrypting, by the TEE, the second encrypted data by using a public key of the trusted institution to obtain trusted data; and verifying, by the TEE, user basic data based on the trusted data.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a blockchain network by a trusted execution environment (TEE) in a blockchain node, a trigger instruction based on a timed starting logic, wherein the timed starting logic identifies a starting time to execute a smart contract, wherein the timed starting logic is comprised in a chain code associated with the blockchain network, and wherein the chain code comprises information of a blockchain account and is executable by the blockchain node to determine the information of the blockchain account;

retrieving, by the TEE, first encrypted data from a first institution;

decrypting, by the TEE, the first encrypted data;

receiving, by the TEE, a data sharing request from a second institution, wherein the data sharing request comprises a user identity corresponding to user basic data;

retrieving, by the TEE, the user basic data based on the user identity;

performing, by the TEE, verification processing of the user basic data based on the trigger instruction to obtain a verification result; and sending, by the TEE, the verification result to the second institution.

16. The computer-implemented system of claim 15, wherein the trigger instruction invokes the smart contract deployed in the TEE to perform the verification processing of the user basic data.

17. The computer-implemented system of claim 15, wherein the user identity comprises an account registered by a user at the first institution or assigned to the user by the first institution in response to an operation initiated by the user at the first institution.

18. The computer-implemented system of claim 15, wherein the one or more operations comprise:

invoking, by the TEE, the smart contract to decrypt the first encrypted data.

19. The computer-implemented system of claim 15, wherein the one or more operations comprise:

invoking, by the TEE, the smart contract to send the data sharing request to the first institution.

20. The computer-implemented system of claim 15, wherein the user identity comprises a digest value obtained through a hash calculation on one or more pieces of information in the user basic data.

* * * * *